US009071712B2

(12) United States Patent
Ino et al.

(10) Patent No.: US 9,071,712 B2
(45) Date of Patent: Jun. 30, 2015

(54) IMAGE FORMING APPARATUS

(71) Applicant: CANON KABUSHIKI KAISHA, Tokyo (JP)

(72) Inventors: Kazushi Ino, Suntou-gun (JP); Ichiro Yasumaru, Mishima (JP); Atsushi Ogata, Mishima (JP); Daisuke Kaneko, Suntou-gun (JP); Tomoyuki Iwakoshi, Suntou-gun (JP); Masaru Aoki, Numazu (JP); Hiroshi Kato, Odawara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/253,118

(22) Filed: Apr. 15, 2014

(65) Prior Publication Data
US 2014/0320940 A1 Oct. 30, 2014

(30) Foreign Application Priority Data
Apr. 25, 2013 (JP) .................................. 2013-092117

(51) Int. Cl.
*H04N 1/04* (2006.01)
*H04N 1/00* (2006.01)

(52) U.S. Cl.
CPC ................................. *H04N 1/00572* (2013.01)

(58) Field of Classification Search
CPC ............ B65H 3/06; B65H 3/66; B65H 45/12; B65H 45/144; B65H 45/148; B65H 45/30; B65H 5/021; B65H 5/36; B65H 7/00; B65H 7/10; B65H 7/125; B65H 7/14; B65H 85/00; B65H 9/002; B65H 9/006; H04N 1/04; H04N 1/40; H04N 1/00; H04N 1/047; H04N 1/028
See application file for complete search history.

(56) References Cited

U.S. PATENT DOCUMENTS

| 5,918,876 | A | * | 7/1999 | Maruyama et al. ............ 271/228 |
| 5,992,841 | A | * | 11/1999 | Fujii et al. ..................... 271/3.02 |
| 6,027,108 | A | * | 2/2000 | Johdai et al. ................. 271/3.02 |
| 6,382,614 | B1 | | 5/2002 | Fukatsu et al. |
| 6,637,996 | B1 | | 10/2003 | Hayakawa et al. |
| 6,826,374 | B2 | | 11/2004 | Kato et al. |
| 6,997,449 | B2 | | 2/2006 | Obuchi et al. |
| 7,011,306 | B2 | | 3/2006 | Kato et al. |

(Continued)

FOREIGN PATENT DOCUMENTS

JP 2006-232467 A 9/2006

*Primary Examiner* — Negussie Worku
(74) *Attorney, Agent, or Firm* — Fitzpatrick, Cella, Harper & Scinto

(57) ABSTRACT

An image forming apparatus includes a sheet feed portion configured to feed a sheet, an image forming portion configured to form an image on the sheet, a first conveying path configured to guide the sheet fed from the sheet feed portion such that the sheet passes through the image forming portion, a second conveying path configured to guide the sheet on which the image has been formed on one surface thereof by the image forming portion to the first conveying path again, a document feed portion configured to feed a document to the second conveying path, an image reading portion configured to read an image of the document fed by the document feed portion, and a control portion configured to control the sheet feed portion and the document feed portion such that the document and the sheet are conveyed on the second conveying path in a sequence in which the document and the sheet are mixed in a case where an operation of forming images respectively on both surfaces of a plurality of sheets overlaps with an operation of reading images of a plurality of documents.

26 Claims, 17 Drawing Sheets

(56) References Cited

U.S. PATENT DOCUMENTS

| | | | | |
|---|---|---|---|---|
| 7,050,751 | B2 | 5/2006 | Watanabe et al. | |
| 7,597,311 | B2 | 10/2009 | Kawata et al. | |
| 7,755,804 | B2 * | 7/2010 | Ikeno et al. | 358/461 |
| 7,775,510 | B2 * | 8/2010 | Yamamura et al. | 270/39.01 |
| 7,874,558 | B2 | 1/2011 | Ogata et al. | |
| 7,952,770 | B2 * | 5/2011 | Ikeno et al. | 358/461 |
| 8,038,147 | B2 | 10/2011 | Ogata et al. | |
| 8,061,712 | B2 | 11/2011 | Tsuji et al. | |
| 8,246,032 | B2 * | 8/2012 | Nakajima | 270/58.01 |
| 8,434,753 | B2 | 5/2013 | Fukatsu et al. | |
| 8,508,817 | B2 * | 8/2013 | Sato | 358/498 |
| 8,720,886 | B2 | 5/2014 | Kuroda et al. | |
| 8,760,727 | B2 * | 6/2014 | Hara | 358/449 |
| 8,862,042 | B2 * | 10/2014 | Sakamoto et al. | 399/341 |
| 8,953,231 | B2 * | 2/2015 | Nakayoshi et al. | 358/498 |
| 8,991,821 | B2 * | 3/2015 | Oosaki et al. | 271/270 |
| 8,994,963 | B2 * | 3/2015 | Osanai et al. | 358/1.12 |
| 2013/0277909 | A1 | 10/2013 | Ino | |
| 2013/0293909 | A1 | 11/2013 | Endo et al. | |
| 2014/0320877 | A1 | 1/2014 | Shiri et al. | |
| 2014/0320939 | A1 | 1/2014 | Mills | |
| 2014/0327921 | A1 | 11/2014 | Ogata et al. | |

* cited by examiner

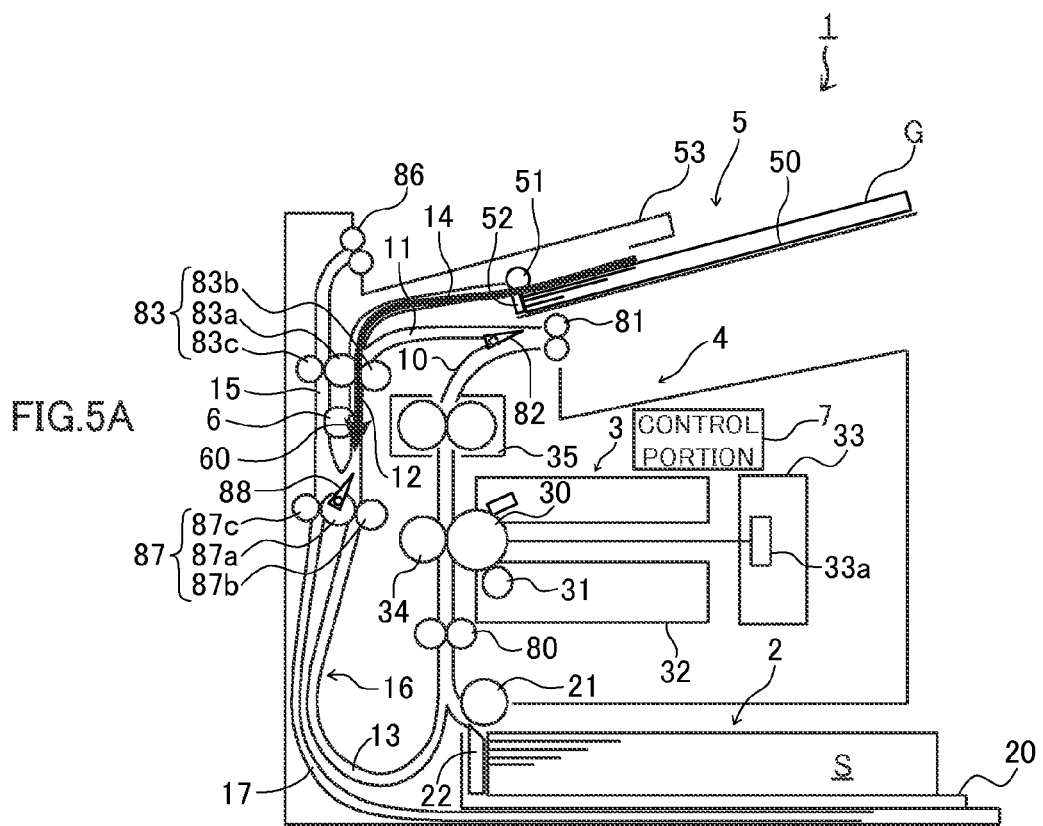

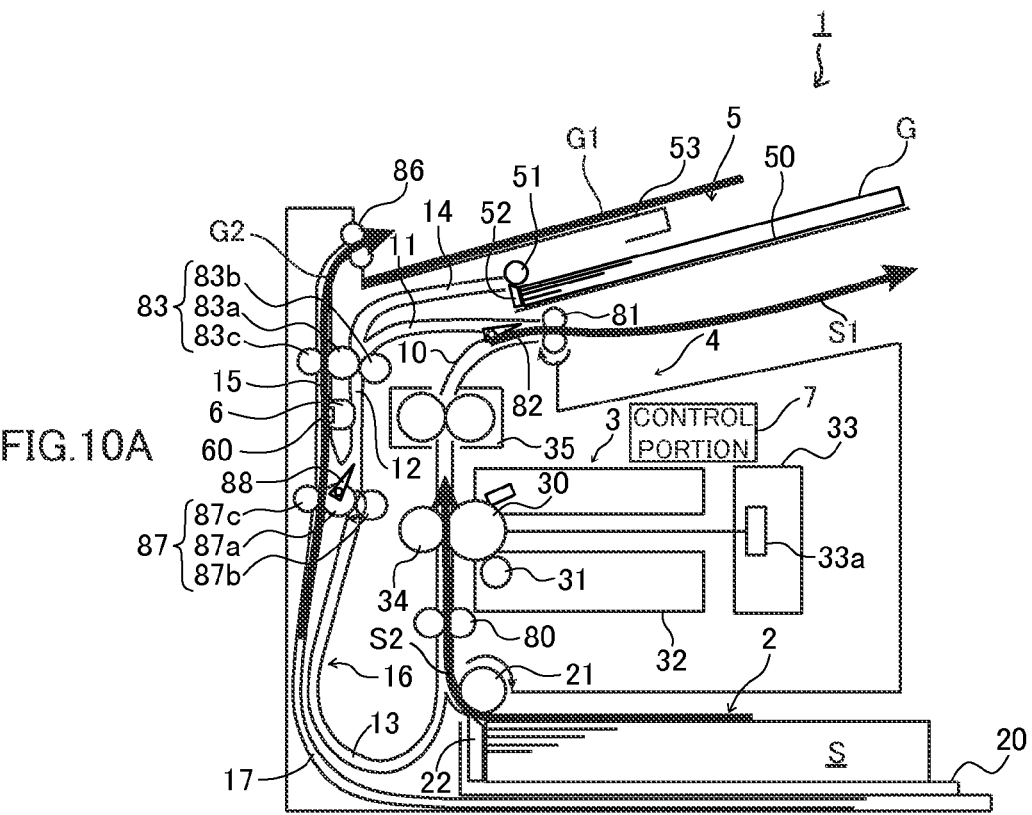
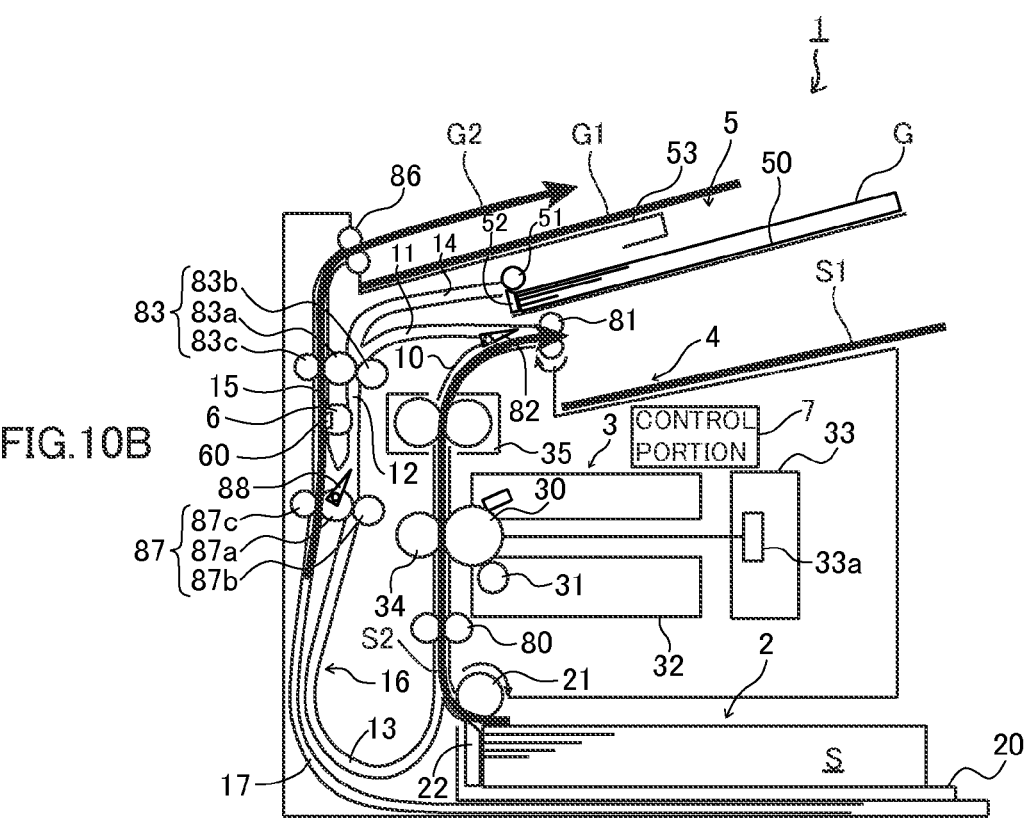

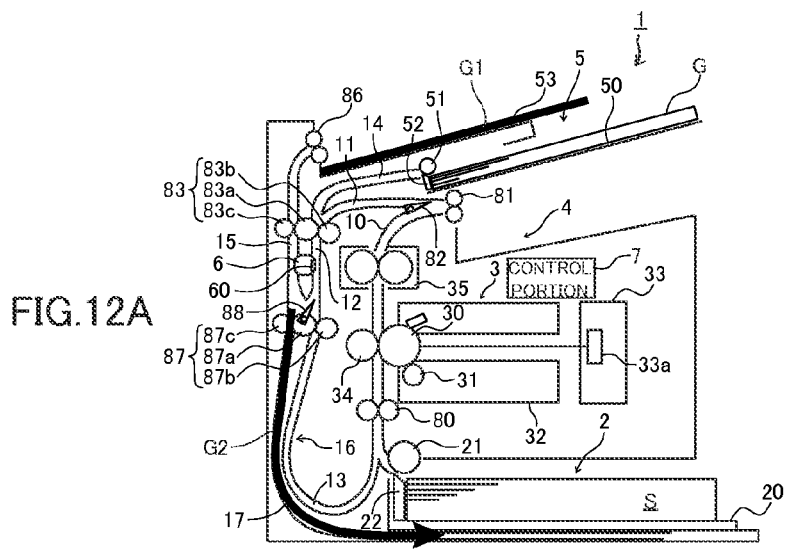

us 9,071,712 B2

IMAGE FORMING APPARATUS

BACKGROUND OF THE INVENTION

1. Field of the Invention

The present invention relates to an image forming apparatus configured to be able to read an image of a document.

2. Description of the Related Art

Hitherto, there is known an image forming apparatus including an auto document feeder (ADF) capable of automatically feeding a document to an image reading portion capable of reading an image of the document in forming the image skimmed by the image reading portion on a sheet. Further, an image forming apparatus capable of forming images on both sides of a sheet normally includes a duplex conveying path configured to convey the sheet to an image forming portion to form the one image on a first surface of the sheet and then to reverse the sheet to convey the sheet again to the image forming portion to form the other image on a second surface of the sheet.

Here, the image forming apparatus including the ordinary automatic feeder poses a problem that the apparatus is enlarged because a document conveying path conveying a document and a sheet conveying path conveying a sheet are provided separately within the apparatus. Then, Japanese Patent Application Laid-open No. 2006-232467 has proposed an image forming apparatus downsized by commonizing a part of a document conveying path of the automatic feeder and a part of a duplex conveying path in a body of the image forming apparatus.

However, because the image forming apparatus described in Japanese Patent Application Laid-open No. 2006-232467 shares the duplex conveying path for feeding a document and for conveying a sheet, timings for conveying the sheet and the document are largely restricted in executing an image forming operation performed on the sheet and an image reading operation performed on the document. Therefore, the image forming apparatus described above has had a problem that productivity of the apparatus drops because it is difficult to carry out a copying function of reading an image from a document and of forming the read image on a sheet and to read an image of the document in forming an image.

SUMMARY OF THE INVENTION

According to an aspect of the present invention, an image forming apparatus includes a sheet feed portion configured to feed a sheet, an image forming portion configured to form an image on the sheet, a first conveying path configured to guide the sheet fed from the sheet feed portion such that the sheet passes through the image forming portion, a second conveying path configured to guide the sheet on which the image has been formed on one surface thereof by the image forming portion to the first conveying path again, a document feed portion configured to feed a document to the second conveying path, an image reading portion configured to read an image of the document fed by the document feed portion, and a control portion configured to control the sheet feed portion and the document feed portion such that the document and the sheet are conveyed on the second conveying path in a sequence in which the document and the sheet are mixed in a case where an operation of forming images respectively on both surfaces of a plurality of sheets overlaps with an operation of reading images of a plurality of documents.

Further features of the present invention will become apparent from the following description of exemplary embodiments (with reference to the attached drawings).

BRIEF DESCRIPTION OF THE DRAWINGS

FIG. 5A is a schematic section view illustrating an image reading job of the printer in a case where a document is conveyed to the common conveying path.

FIG. 5B is a schematic section view illustrating an image reading job of the printer in a case where the document is conveyed to a reverse conveying path.

FIG. 10A is a schematic section view illustrating the operation of the printer in the first copy mode in a case where a sheet is fed.

FIG. 10B is a schematic section view illustrating the operation of the printer in the first copy mode in a case where the document is discharged out of the apparatus.

FIG. 12A is a schematic section view illustrating the operation of the printer in the second copy mode in a case where the document is conveyed to the reverse conveying path.

FIG. 12B is a schematic section view illustrating the operation of the printer in the second copy mode in a case where the document is discharged out of the apparatus.

FIG. 12C is a schematic section view illustrating the operation of the printer in the second copy mode in a case where the sheet is conveyed to the common conveying path.

DESCRIPTION OF THE EMBODIMENTS

An image forming apparatus of embodiments of the present invention will be described with reference to the drawings. The image forming apparatus of the embodiments of the invention includes an image reading apparatus capable of reading an image of a document, such as a copier, a printer, a facsimile, and a multi-function printer. The image forming apparatus will be described by assuming an electro-photographic laser beam printer (referred to simply as a "printer" hereinafter) in the following embodiments.

The printer 1 of a first embodiment of the invention will be described below with reference to FIG. 1 through FIG. 17B. At first, an overall schematic configuration of the printer 1 of the present embodiment will be described with reference to FIGS. 1 and 2.

Figure 1:
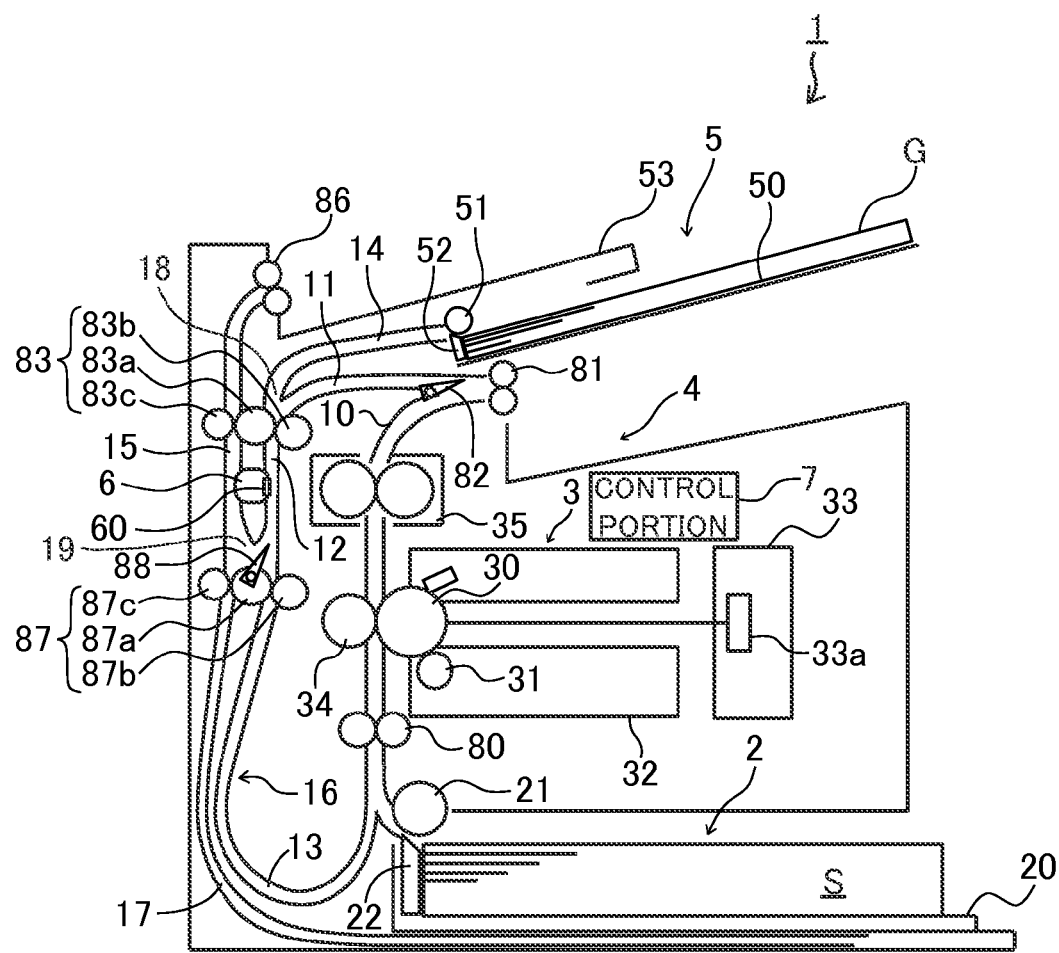
FIG. 1 is a section view schematically illustrating a configuration of printer of an embodiment of the present invention.

As shown in FIG. 1, the printer 1 includes a sheet feed portion 2 located at a lower part of the printer 1, an image forming portion 3 located above the sheet feed portion 2, and a sheet stacking portion 4 located at an upper part of the printer 1. A sheet on which an image has been formed by the image forming portion 3 is discharged to the sheet stacking portion 4 by a discharge roller pair (sheet discharge portion) 81. The printer 1 also includes a document feed portion 5 located at an upper part of the printer 1, an image reading portion 6 located at an inner side part of the printer 1, a discharged document stacking portion 53 located at an upper part of the printer 1, and a control portion 7.

The printer 1 further includes a sheet conveying path (first conveying path) 10 provided between the sheet feed portion 2 and the discharge roller pair 81, and a duplex conveying path (second conveying path) 16 connecting a downstream and an upstream in a sheet conveying direction of the sheet conveying path 10. More specifically, the sheet conveying path 10 forms the conveying path between the sheet feed portion 2 and a sheet discharge roller pair 81 described later and the image forming portion 3 is provided on a way of the conveying path. The duplex conveying path 16 connects the upstream and downstream in the sheet conveying direction of the image forming portion 3 of the sheet conveying path 10 in a manner of bypassing the image forming portion 3 and includes a reverse conveying path 11 connected to the downstream in the sheet conveying direction of the sheet conveying path 10, a common conveying path 12 connected to a downstream end of the reverse conveying path 11, and a U-turn conveying path 13 connecting a downstream end of the common conveying path 12 with the upstream in the conveying direction of the sheet conveying path 10. The printer 1 also includes a discharge roller pair (document discharge portion) 86 discharging a document to the discharged document stacking portion 53, a document feed path 14 merging to a junction 18 at an upstream end of the common conveying path 12, a document discharge path 15 connecting a part connecting the common conveying path 12 and the U-turn conveying path 13 with a discharge roller pair 86, and a reverse conveying path 17 branched from the connecting part. The document conveying path is constructed by the document feed path 14, the common conveying path 12 and the document discharge path 15.

The sheet feed portion 2 includes a feed tray 20 stacking sheets S, a feed roller 21 feeding the sheet S on the feed tray 20, and a separation portion 22 separating the sheets S fed by the feed roller 21 one by one.

The image forming portion 3 includes a processing cartridge 32 constructed by integrating image forming processing portions such as a photoconductive drum 30, a developing sleeve 31, and others, and an exposure unit 33 configured to irradiate a laser beam to the photoconductive drum 30 based on image information. The image forming portion 3 also includes a transfer roller 34 configured to transfer a toner image formed on the photoconductive drum 30 to a sheet S and a fixing portion 35 configured to fix the toner image transferred to the sheet S. The fixing portion 35 includes a pressure roller pressing a sheet and a heating roller heating the sheet.

The document feed portion 5 feeds a document from a document tray (document stacking portion) 50 on which documents G to be fed are stacked. The document feed portion 5 includes a document feed roller feeding the documents G stacked on the document tray 50 sequentially one by one and a separation portion 52 separating the documents G fed by the document feed roller 51 one by one.

The image reading portion 6 includes a read sensor not shown and a read cover 60 composed of a transparent member such as a glass. The read sensor is provided within the image reading portion 6. The read cover 60 is provided so as to face the rear sensor and prevents foreign matters from entering the inside of the image reading portion 6. The image reading portion 6 reads an image of the document G passing through and facing the read cover 60 by the read sensor provided therein. The image reading portion 6 is provided between the common conveying path 12 and the document discharge path 15 and is configured to be able to move to a first read position where the image reading portion 6 reads the image of the document G passing through the common conveying path 12 and a second read position where the image reading portion 6 reads another image of the document G passing through the document discharge path 15. In the present embodiment, the image reading portion 6 moves to the first and second read positions by turning by 180 degrees centering on an axis of rotation.

The sheet conveying path 10 extends from the sheet feed portion 2 so as to pass through a transfer nip composed of the photoconductive drum 30 and the transfer roller 34 and a fixing nip composed of the pressure and heat rollers. Provided along the sheet conveying path 10 between the sheet feed portion 2 and the image forming portion 3 is a conveying roller pair 80 conveying a sheet S through the sheet conveying path 10. Provided at a downstream end in the sheet conveying direction of the sheet conveying path 10 is the discharge roller pair 81 capable of rotating in normal and reverse directions. By rotating normally, the discharge roller pair 81 can discharge the sheet S to the sheet stacking portion 4 (outside of the apparatus) and can convey the sheet S to the reverse conveying path 11 by rotating reversely in printing images on both sides of the sheet S.

Provided at a branch part of the sheet conveying path 10 and the reverse conveying path 11 is a first switching member (first rock guide) 82 guiding the sheet S moving through the sheet conveying path 10 to the sheet stacking portion 4 and guiding the sheet S reversed by the discharge roller pair 81 to the reverse conveying path 11 in printing the images on the both surfaces of the sheet S. It is noted that the first switching member 82 is connected to a first solenoid SL1 (see FIG. 2) and the first solenoid SL1 is controlled and driven by the control portion 7.

The reverse conveying path 11 extends toward the side substantially horizontally. The common conveying path 12 extends downward and guides the sheet S downward. Provided along an upstream in the conveying direction of the common conveying path 12 is a duplex conveying triple roller 83 composed of a driving roller 83a and rollers 83b and 83c provided on both sides of the driving roller 83a and having nip portions formed on both sides of the driving roller 83a by rollers 83b and 83c in pressure contact with the roller 83a with a predetermined pressure. The duplex conveying triple roller 83 conveys the sheet S and the document G guided to the common conveying path 12 toward the downstream in the conveying direction (downward direction in FIG. 1) by normally rotating the driving roller 83a. The duplex conveying triple roller 83 also conveys the document G guided to the document discharge path 15 toward a downstream in a document discharge direction (upward direction in FIG. 1) opposite from the document feed direction by normally rotating and driving the driving roller 83a.

The U-turn conveying path 13 extends downward and makes a U-turn toward the sheet conveying path 10 at a lower end part of the printer 1. The document discharge path 15 extends upward substantially in parallel with the common conveying path 12. Provided at a downstream end of the document discharge path 15 is a discharge roller pair 86 discharging the document G to the discharged document stacking portion 53. The reverse conveying path 17 extends downward substantially in parallel with the U-turn conveying path 13, then bends at a lower end part of the printer 1 and extends substantially horizontally toward a lower part of the sheet feed portion 2. The reverse conveying path 17 guides the document G moving through the common conveying path 12 downward without entering the U-turn conveying path 13.

Provided at a branch portion 19 between the duplex conveying path 16 and the reverse conveying path 17 is a duplex conveying triple roller (document reverse conveying roller pair) 87 composed of a driving roller 87a and rollers 87b and 87c provided on both sides of the driving roller 87a and having a triple roller configuration in which nips are formed by the rollers 87b and 87c in pressure contact with the driving roller 87a with a predetermined pressure. The duplex conveying triple roller 87 conveys the sheet S a downstream in the sheet conveying direction of the U-turn conveying path 13 (downward direction in FIG. 1) by normally rotating and driving the driving roller 87a and conveys the document G guided to the reverse conveying path 17 to the downstream in the document discharge direction (upward direction in FIG. 1) opposite from the document feed direction by normally rotating and driving the driving roller 87a. The duplex conveying triple roller 87 also conveys the document G to a downstream in the document feed direction of the reverse conveying path 17 (downward direction in FIG. 1) by reversely rotating and driving the driving roller 87a.

Provided at the branch portion 19 is a second switching member (second rock guide) 88 guiding the sheet S moving through the common conveying path 12 to the U-turn conveying path 13 and guiding the document G moving through the common conveying path 12 to the reverse conveying path 17. The second switching member 88 also guides the document G to the document discharge path 15 in a case where the document G is switched back by the driving roller 87a and the roller 87c. It is noted that the second switching member 88 is connected to a second solenoid SL2 which is controlled and driven by the control portion 7.

Figure 2:
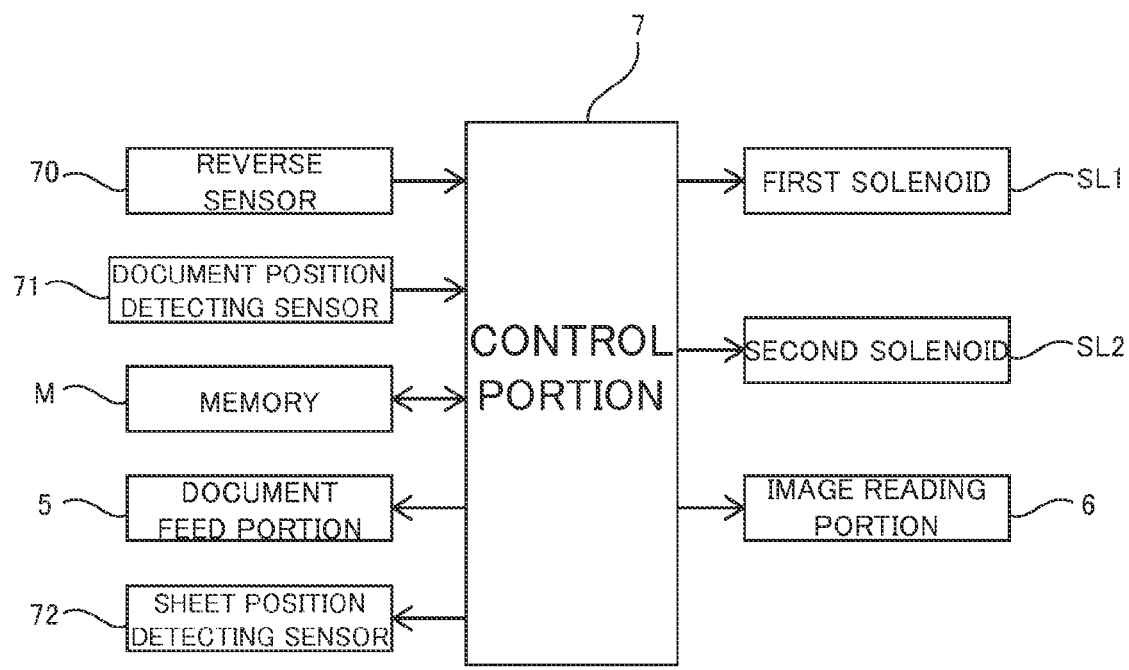
FIG. 2 is a block diagram showing a configuration of a control portion of the printer of the present embodiment.

As shown in FIG. 2, connected to the control portion 7 are the first solenoid SL1 driving the first switching member 82, the second solenoid SL2 driving the second switching member 88, a reverse sensor 70 described later, the image reading portion 6, and the document feed portion 5. Connected also to the control portion 7 are a document position detecting sensor 71 capable of detecting a passage of the document G, a memory M storing image information of the document G read by the image reading portion 6 and a sheet position detecting sensor 72 capable of detecting a passage of the sheet S.

Next, an operation of forming an image to the sheet S (simplex and duplex printings) of the printer 1 constructed as described above will be described with reference to FIGS. 3A through 4B.

In response to a start of the image forming operation, the feed roller 21 is rotated by receiving a feed start signal from the control portion 7. Thereby, the feed roller 21 sends out the sheets S on the feed tray 20. The separation portion 22 separates the sheets S one by one and the conveying roller pair 80 conveys the sheet S toward the image forming portion 3. Then, when a sheet front edge sensor not shown detects a front edge of the sheet S, the photoconductive drum 30 is rotated and is uniformly charged with a predetermined polarity and predetermined potential by a charging roller not shown. Then, a laser beam is irradiated to the photoconductive drum 30 from a light emitting portion 33a provided within the exposure unit 33 based on image information to the photoconductive drum 30 whose surface has been charged. Then, an electrostatic latent image is formed on the photoconductive drum 30 in response to the irradiation of the laser beam. This electrostatic latent image is developed by toner supplied from the developing sleeve 31 and is visualized as a toner image.

Figure 3A:
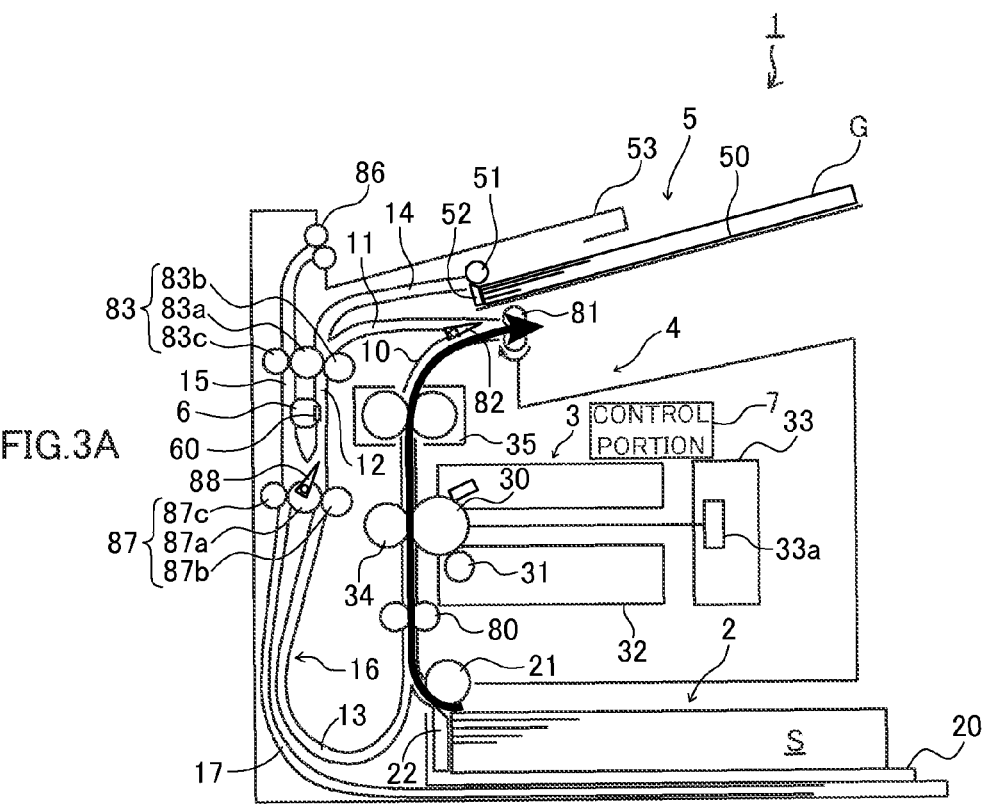
FIG. 3A is a schematic section view illustrating an image forming job of the printer in a case where a sheet is supplied.

When the sheet S arrives at the transfer nip, the toner image is transferred to a first surface of the sheet S by bias and pressure applied to the transfer roller 34. Then, as the toner image is transferred to a first surface of the sheet S, the sheet S is conveyed to the fixing portion 35 and the toner image is fixed by heat and pressure applied at the fixing nip. The sheet S on which the toner image has been fixed is then discharged out of the apparatus by the discharge roller pair 81 and is stacked sequentially on the sheet stacking portion 4 as shown in FIG. 3A. Thus, the image forming operation of the simplex printing ends.

Figure 3B:
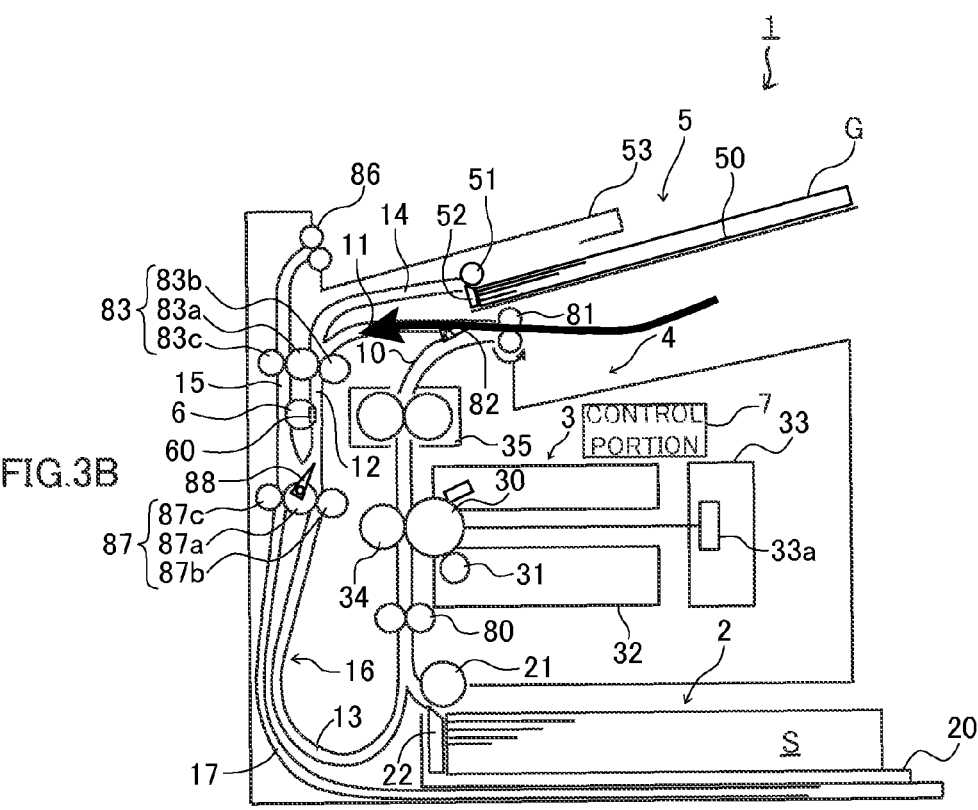
FIG. 3B is a schematic section view illustrating the image forming job of the printer in a case where the sheet is conveyed to a common conveying path.

Meanwhile, in a case where images are to be formed on both sides of the sheet S (duplex printing), the control portion 7 reversely rotates the discharge roller pair 81 as the reverse sensor 70 (see FIG. 2) detects that a rear edge of the sheet S has passed through the branch part of the sheet conveying path 10 and the reverse conveying path 11. The control portion 7 also drives the first solenoid SL1 (see FIG. 2) to turn the first switching member 82 provided at the branch portion clockwise to switch a conveying direction of the sheet S. By being switched back by the discharge roller pair 81, the sheet S on which the image has been formed on the first surface thereof is guided substantially horizontally through the reverse conveying path 11 from the rear edge until then as a head as shown in FIG. 3B and enters the common conveying path 12.

Figure 4A:
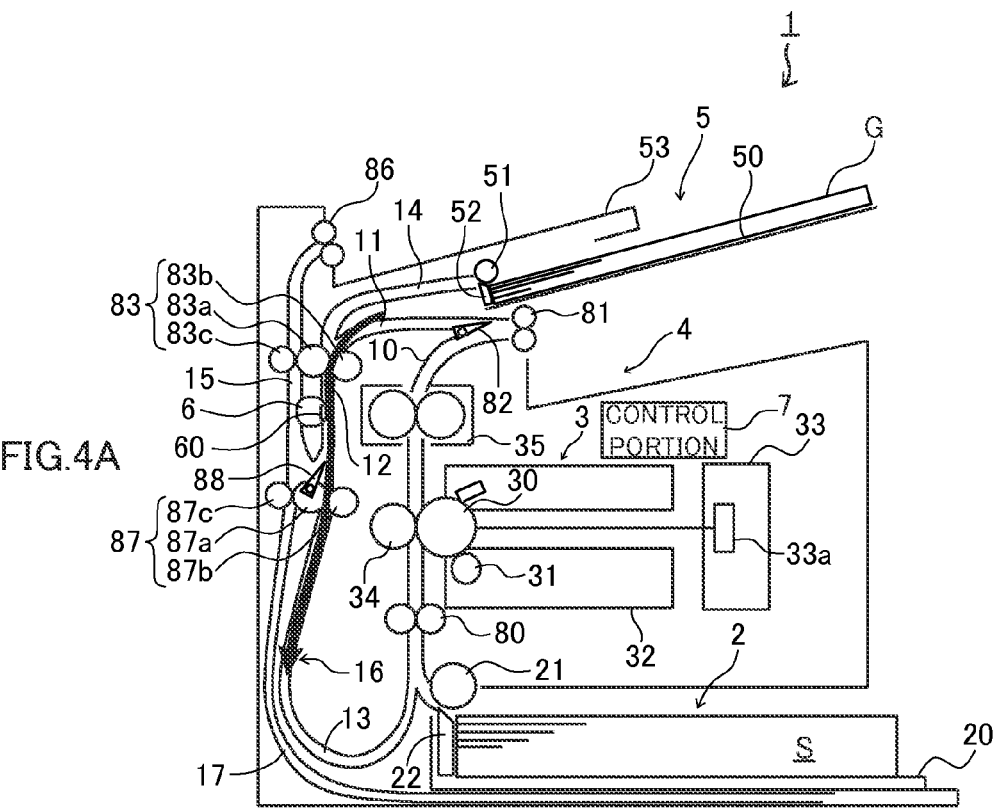
FIG. 4A is a schematic section view illustrating the image forming job of the printer in a case where the sheet is conveyed to the common conveying path.
Figure 4B:
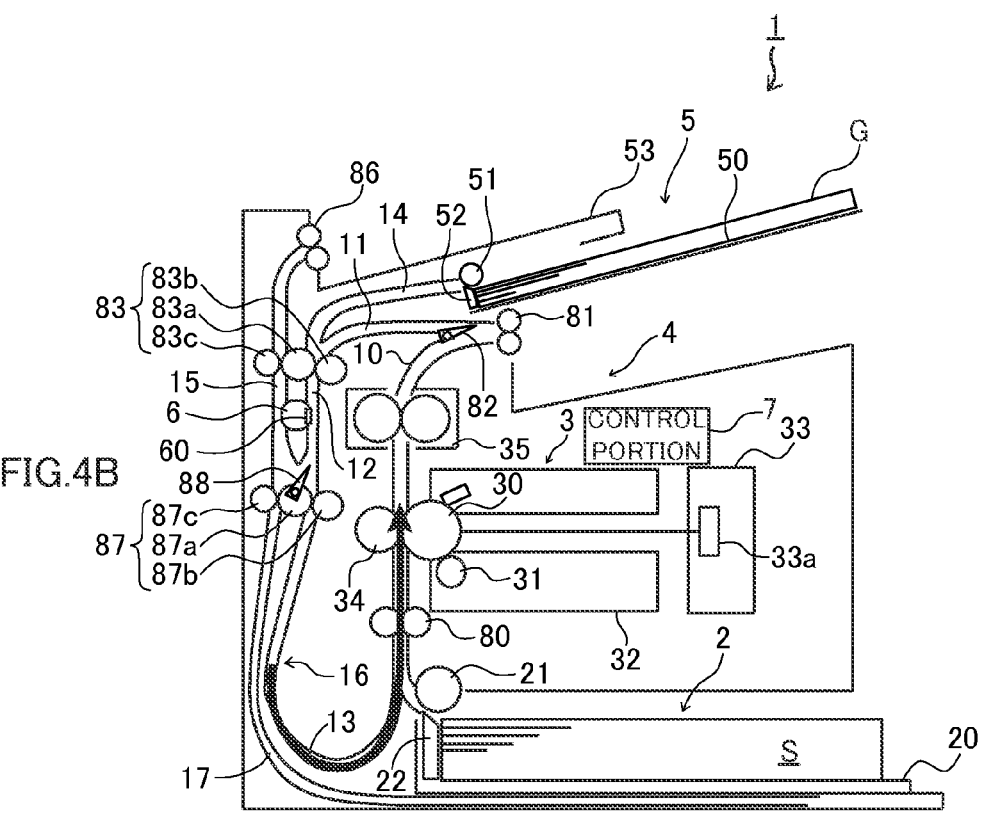
FIG. 4B is a schematic section view illustrating the image forming job of the printer in a case where the sheet is conveyed to a sheet conveying path.

The sheet S entering the common conveying path 12 is conveyed downward along the common conveying path 12 by the driving roller 83a and the roller 83b as shown in FIG. 4A and enters the U-turn conveying path 13. The sheet S entering the U-turn conveying path 13 is turned around by the driving roller 87a and the roller 87b along the U-turn conveying path 13 and enters the sheet conveying path 10 at a part between the sheet feed portion 2 and the image forming portion 3 again as shown in FIG. 4B. Thereby, the sheet S is guided to the conveying roller pair 80 again in a condition in which the front and back (first and second) surfaces of the sheet S are reversed, and an image is formed on a second surface by a similar operation performed in forming the image on the first surface. The sheet S on which the images have been formed on the both (first and second) surfaces is then discharged out of the apparatus by the discharge roller pair 81 and is stacked on the sheet discharge portion 4. Thus, the image forming operation of the duplex printing ends.

Next, an operation of reading an image of the document G by the printer 1 constructed as described above (simplex and duplex reading operations) will be explained with reference to FIGS. 5A through 6B.

In the case of reading the image of the document G, the control portion 7 rotates the document feed roller 51 to send out the documents G and then the separation portion 52 separates the documents G one by one to feed the document G to the document feed path 14. The document G fed to the document feed path 14 is conveyed by the driving roller 83a and the roller 83b toward a downstream in a document feed direction (downward) along the common conveying path 12 as shown in FIG. 5A. At this time, the image reading portion 6 moves to the first reading position where the image reading portion 6 reads the image of the document G passing through the common conveying path 12. That is, the image reading portion 6 can read the image of the first surface of the document G as the document G passes through the common conveying path 12. Image information thus read is stored in a memory M (see FIG. 2) as image information of the first surface of the document G.

Figure 6A:
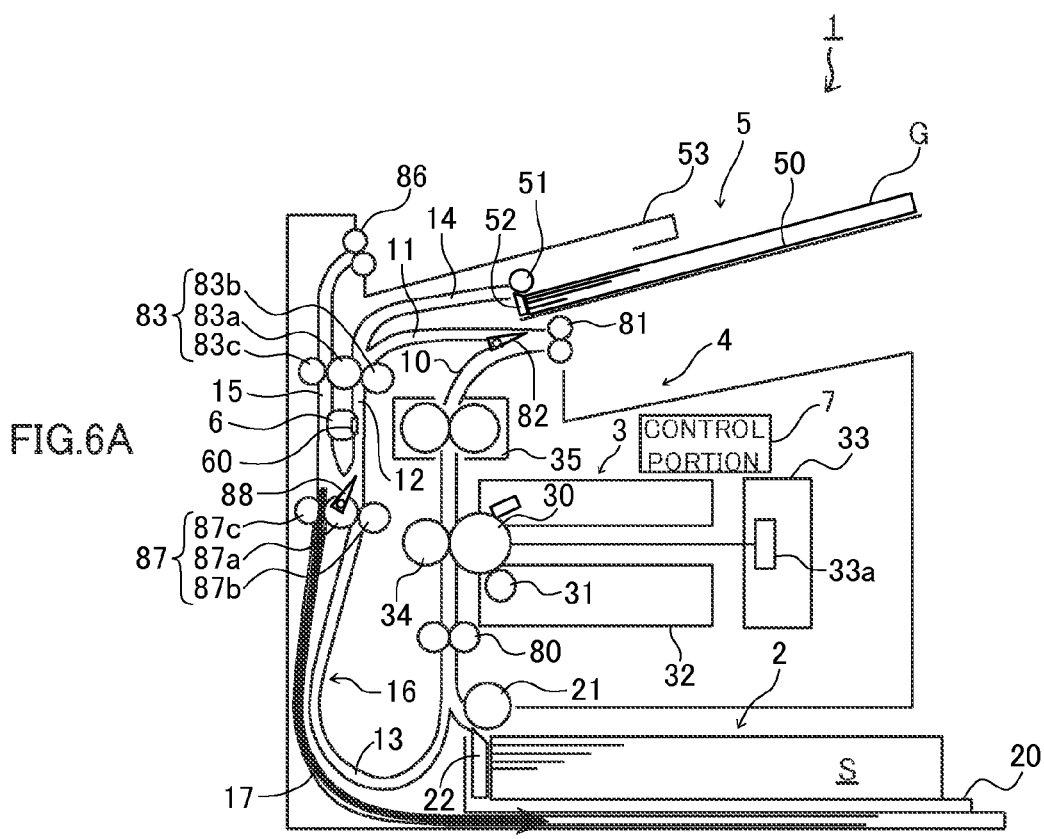
FIG. 6A is a schematic section view illustrating an image reading job of the printer in a case where the document is conveyed to the reverse conveying path.

The document G passing through the image reading portion 6 is guided to the reverse conveying path 17 by the second switching member 88 and is conveyed to the reverse conveying path 17 by the driving roller 87a and the roller 87c as shown in FIG. 5B. When the document position detecting sensor 71 (see FIG. 2) detects that a rear edge of the document G whose image of the first surface has been read by the image reading portion 6 passes through the second switching member 88, the control portion 7 reversely rotates the driving roller 87a as shown in FIG. 6A. The control portion 7 also drives the second solenoid SL2 (see FIG. 2) to turn the second switching member 88 counterclockwise to switch the conveying direction of the document G to the document discharge path 15. Thereby, the document G is switched back toward the document discharge path 15. It is noted that the reverse conveying path 17 is formed such that a length thereof is longer than a maximum length of a document that can be fed by the document feed portion 5.

Figure 6B:
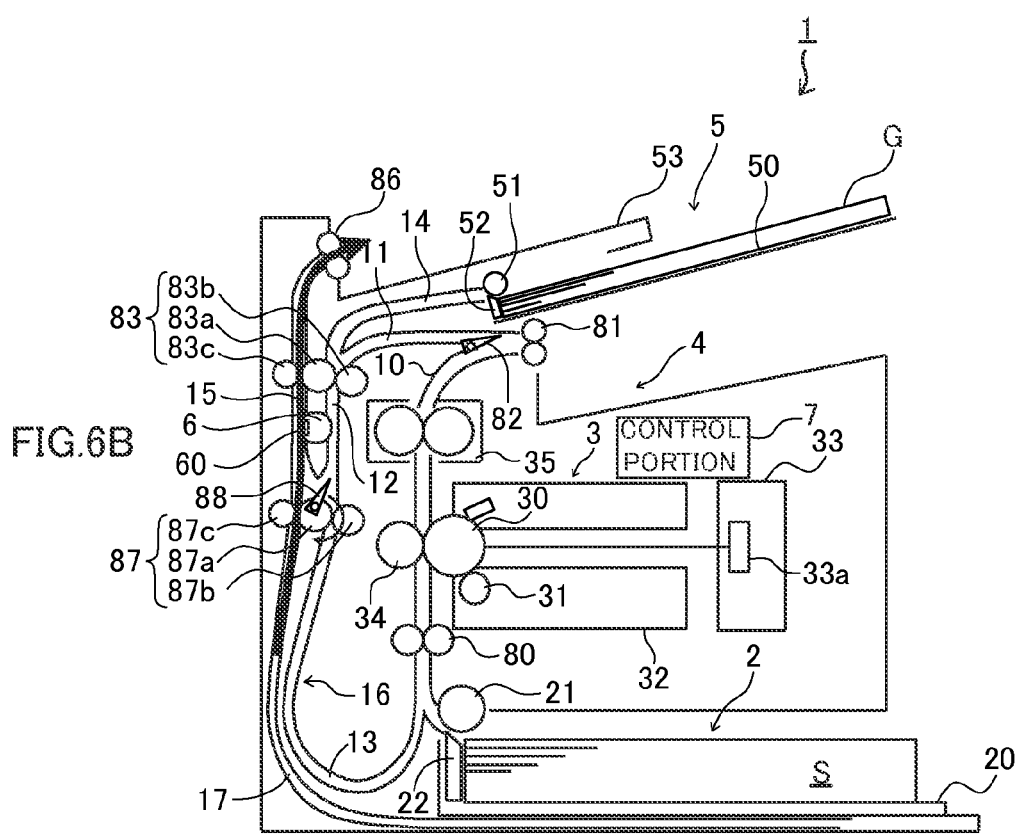
FIG. 6B is a schematic section view illustrating an image reading job of the printer in a case where the document is conveyed to a document discharge path.

In response to the switch-back of the document G, the image reading portion 6 is moved from the first reading position to the second reading position. In the present embodiment, the image reading portion 6 is rotated by 180 degrees such that the read cover 60 side faces the document discharge path 15. Thereby, the image reading portion 6 reads an image of the second surface of the document G as the document G passes through the document discharge path 15 as shown in FIG. 6B. Image information thus read is stored in the memory M (see FIG. 2) as image information of the second surface of the document G.

The document G that has passed through the image reading portion 6 is conveyed upward toward the discharged document stacking portion 53 along the document discharge path 15 by the driving roller 83a and the roller 83c. The document G conveyed through the document discharge path 15 is discharged out of the apparatus by the discharge roller pair 86 provided at a downstream end of the document discharge path 15 and is stacked on the document discharge portion 53. It is noted that in response to the end of reading of the document G, the image reading portion 6 turns by 180 degrees to move again to the first reading position to be ready to read an image of a next document G passing through the common conveying path 12. It is also possible to control such that the image reading portion 6 does not move in a case where a user selects a simplex reading operation arbitrarily.

Here, in a case where the user has selected a copy mode, the image forming operation described above is executed based on the image information stored in the memory. In this case, the image reading operation and the image forming operation are executed in an overlapped condition. In a case where the copy mode is not selected, it is also possible to transmit the image information stored in the memory M to an external personal computer or the like as electronic data.

Next, an operation of the printer 1 in a case where a copy mode of performing the duplex printing of forming read images of the document G on a sheet S is selected will be explained with reference to FIGS. 7A through 17B. Firstly, an operation of the printer 1 in a case where a first copy mode (double surface to double surface) in which images of both surfaces of a plurality of documents G (duplex imaging documents) are formed on both surfaces of each of a plurality of sheets S is selected will be explained with reference to FIGS. 7A through 10B.

Figure 7A:
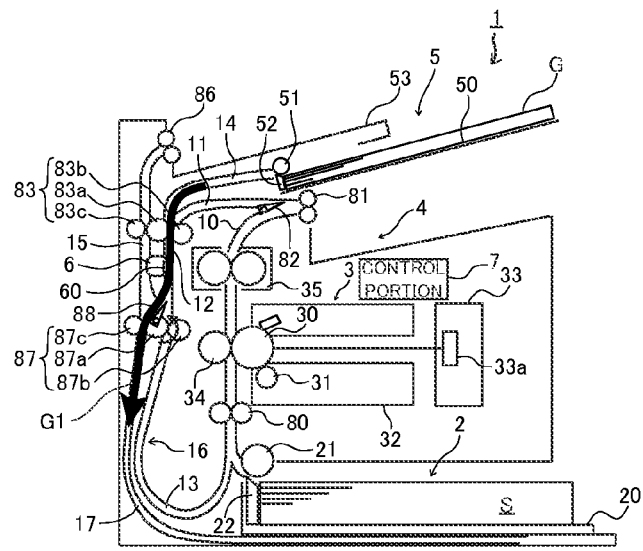
FIG. 7A is a schematic section view illustrating an operation of the printer in a first copy mode in a case where a document is conveyed to the common conveying path.
Figure 7B:
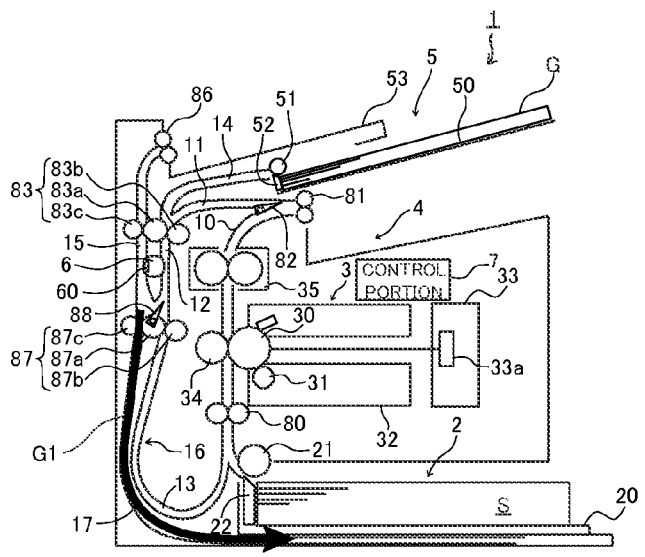
FIG. 7B is a schematic section view illustrating the operation of the printer in the first copy mode in a case where the document is conveyed to the reverse conveying path.

In response to a start of the first copy mode, a first document G1 is fed from a plurality of documents G stacked on the document tray 50 and is conveyed to the common conveying path 12 after passing through the document feed path 14. Then, the image reading portion 6 reads an image of a first surface of the first document G1 passing through the common conveying path 12, and the second switching member 88 guides the first document G1 to the reverse conveying path 17 as shown in FIG. 7A.

Figure 7C:
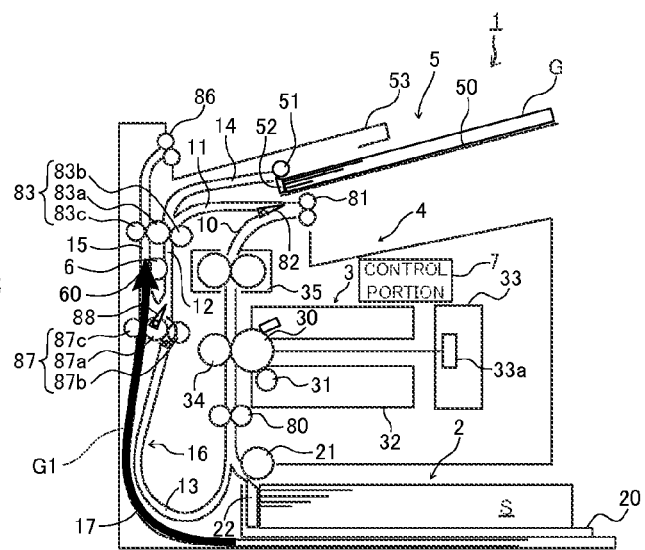
FIG. 7C is a schematic section view illustrating the operation of the printer in the first copy mode in a case where the document is conveyed to the document discharge path.

Next, when the document position detecting sensor 71 (see FIG. 2) detects that a rear edge of the first document G1 has passed through the second switching member 88 (see FIG. 7B), the control portion 7 switches the second switching member 88 and reversely rotate the driving roller 87*a* to switch back the first document G1 toward the document discharge path 15 (see FIG. 7C). It is noted that at this time, the image reading portion 6 moves to the second read position in order to read an image of a second surface of the first document G1 when the first document G1 passes through the document discharge path 15.

Figure 8A:
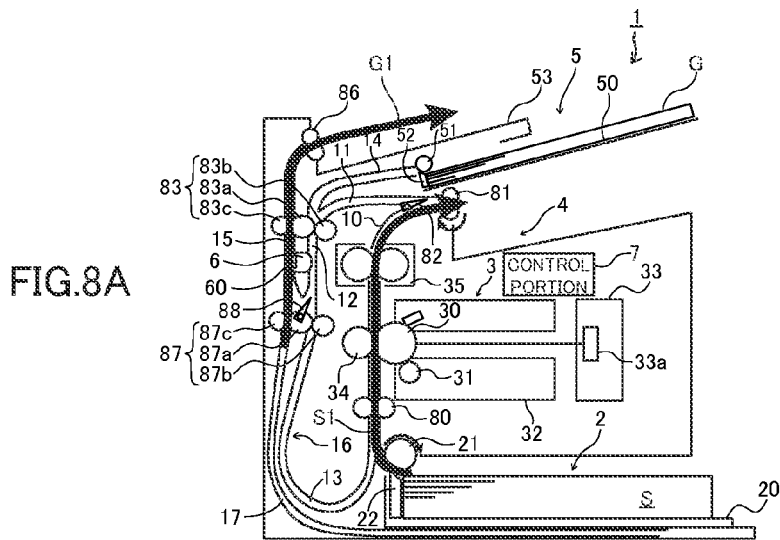
FIG. 8A is a schematic section view illustrating the operation of the printer in the first copy mode in a case where the document is discharged out of the apparatus.
Figure 8B:
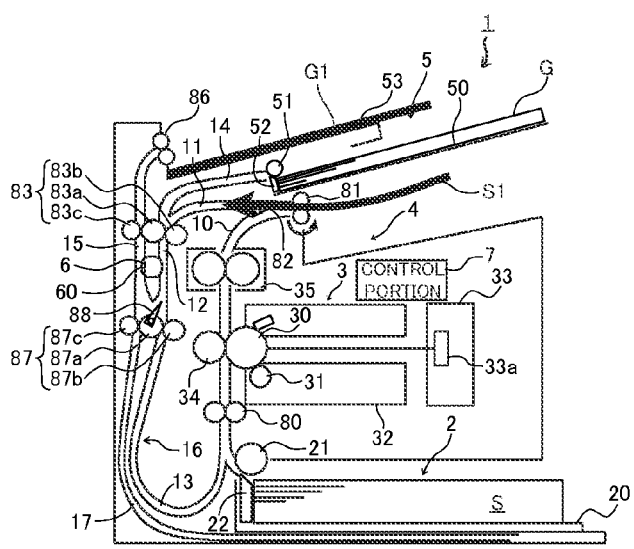
FIG. 8B is a schematic section view illustrating the operation of the printer in the first copy mode in a case where the sheet is conveyed to the common conveying path.

Here, when the image reading portion 6 starts to read the image of the second surface of the first document G1, a first sheet S is started to be fed before the first document G1 is discharged to the discharged document stacking portion 53. Thereby, the operation of reading the image of the second surface of the first document G1 and the operation of forming the image on a first surface of the first sheet S1 are concurrently carried out as shown in FIG. 8A. When the operation of reading the image of the second surface of the first document G1 ends, the first document G1 is discharged to the discharged document stacking portion 53 by the discharge roller pair 86 as shown in FIG. 8B. Meanwhile, the image of the first surface of the first document G1 is formed on the first surface of the first sheet S1 during when the first sheet S1 moves through the sheet conveying path 10, and then the first sheet S1 is switched back to the reverse conveying path 11 by the discharge roller pair 81. It is noted that at this time, the image reading portion 6 is kept at the second read position because it is not necessary to read the image of the first sheet S1.

Figure 8C:
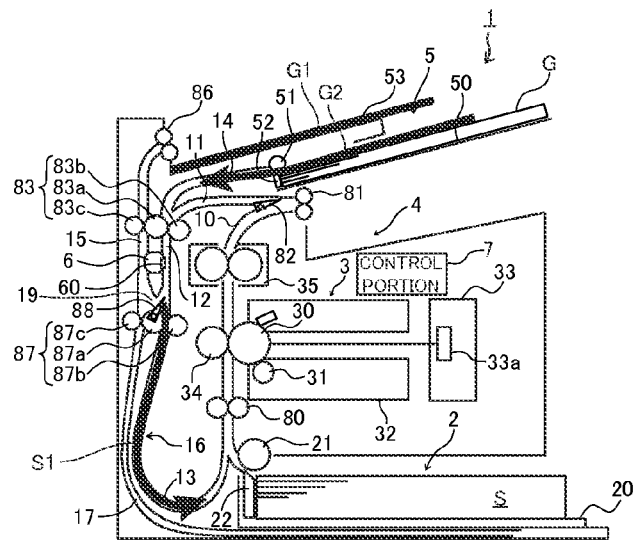
FIG. 8C is a schematic section view illustrating the operation of the printer in the first copy mode in a case where a document is conveyed to the common conveying path.
Figure 9A:
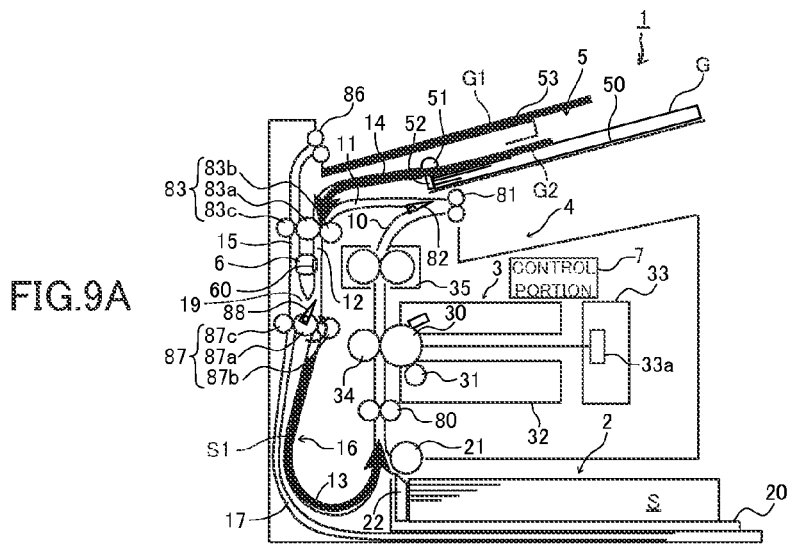
FIG. 9A is a schematic section view illustrating the operation of the printer in the first copy mode in a case where the document is conveyed to the common conveying path.
Figure 9B:
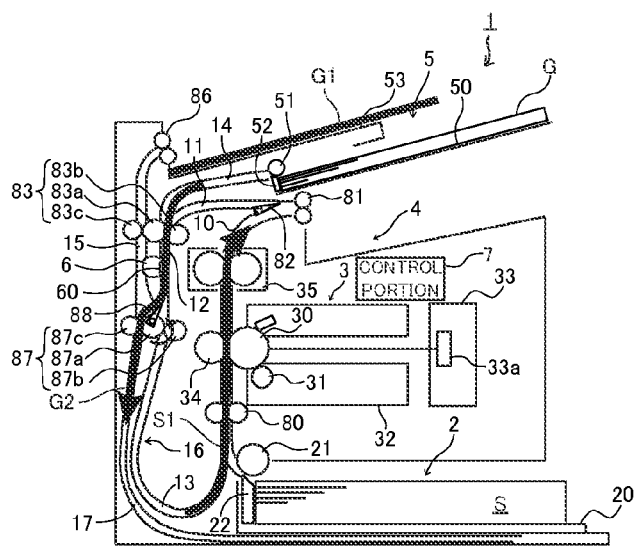
FIG. 9B is a schematic section view illustrating the operation of the printer in the first copy mode in a case where the document is conveyed to the reverse conveying path.

Next, when the sheet position detecting sensor 72 detects that a rear edge of the first sheet S1 has passed through the branch portion 19 as shown in FIG. 8C, the image reading portion 6 moves from the second read position to the first read position, and the document feed roller 51 starts to feed a second document G2. The second document G2 is fed such that the second document G2 is conveyed through the common conveying path 12 sequentially between the first sheet S1 (preceding sheet) and a second sheet S2 (succeeding sheet) described later. Thereby, the duplex conveying path 16 is put into a condition in which the second document G2 follows the first sheet S1, and at least a part of the document and at least a part of the sheet are present mixedly on the duplex conveying path 16. Then, when the rear edge of the first sheet S1 passes through the nip between the driving roller 87*a* and the roller 87*b*, the control portion 7 switches the second switching member 88 and reversely rotates the driving roller 87*a* as shown in FIG. 9A. Thereby, the image reading portion 6 reads an image of a first surface of the second document G2 passing through the common conveying path 12 and then the second switching member 88 guides the second document G2 to the reverse conveying path 17 as shown in FIG. 9B. At this time, the first sheet S1 is conveyed again through the sheet conveying path 10 and the image of the second surface of the first document G1 is formed on a second surface of the first sheet S1 on the sheet conveying path 10.

Figure 9C:
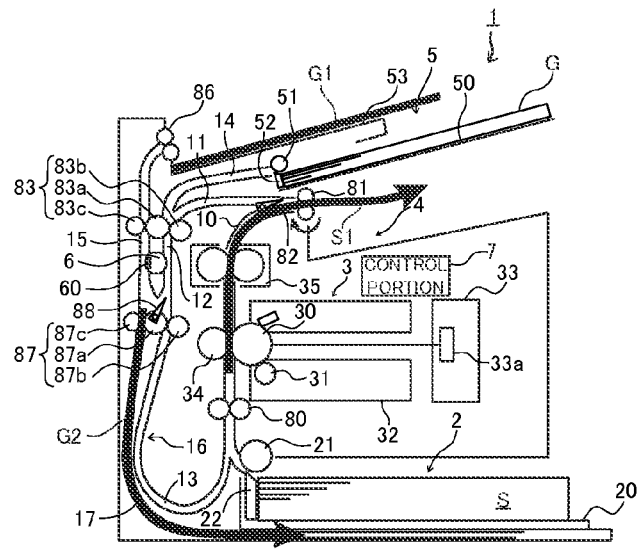
FIG. 9C is a schematic section view illustrating the operation of the printer in the first copy mode in a case where the sheet is discharged of the apparatus.

When the document position detecting sensor 71 detects that a rear edge of the second document G2 has passed through the second switching member 88, the control portion 7 switches the second switching member 88 and normally rotates the driving roller 87*a* to switch back the second document G2 as shown in FIG. 9C. At this time, the image reading portion 6 moves to the second read position as shown in FIG. 10A and reads an image of a second surface of the second document G2 as the second document G2 passes through the document discharge path 15. Meanwhile, because the image of the second surface of the first document G1 has been formed on the second surface of the first sheet S1, i.e., the images of the first document G1 have been formed on the both surfaces of the first sheet S1, the first sheet S1 is discharged to the sheet stacking portion 4.

A second sheet S2 on which the images of the second document G2 are to be copied is fed to the sheet conveying path 10 before the first sheet S1 is completely discharged to the sheet stacking portion 4 and the second document G2 is discharged. Thereby, as shown in FIG. 10B, the second sheet S2 is put into the same condition with the first sheet S1 shown in FIG. 8A. When copying is carried out continuously after that, the abovementioned operation is repeatedly carried out, and copying of a predetermined number of sheets ends, the first copy mode ends. Meanwhile, in a case where copying ends by the second sheet S2, the first copy mode ends by forming the images of the both surfaces of the second document G2 on the both surfaces of the second sheet S2.

As described above, the printer 1 conveys the sheet on which images are to be formed on the both surfaces thereof and the document from which images thereof are to be read on the common conveying path in a sequence in which the document and the sheet are mixed. According to the present embodiment, the printer 1 is configured such that the second document G2 is started to be fed as the rear edge of the first sheet S1 passes through the branch portion 19 so that the sheet and the document are present mixedly and alternately on the duplex conveying path 16. Therefore, it is possible to prevent productivity of the printer 1 from dropping even in the case of executing the copy mode of forming images read in the configuration of reading the images of the document G on the duplex conveying path 16 on the both surfaces of the sheet. This makes it possible to prevent the drop of the productivity while downsizing the printer 1.

Here, a reason why the copy mode can be executed without hampering the productivity of the printer 1 will be explained by comparing with a case where no sheet mixedly exists with a document. In this case, it is unable to execute the operations of reading a document and of forming an image on a sheet (see FIG. 9B).

Meanwhile, it is possible for the printer 1 of the present embodiment to effectively and actively use a waiting time in feeding a next sheet by making a sheet and a document be present mixedly within the duplex conveying path 16 by alternately conveying the document and the sheet to the common conveying path 12. Therefore, it is possible to shorten a time of a whole job. This makes it possible to prevent the drop of the productivity even in the case where the printer 1 is downsized by providing the common conveying path 12.

It is noted that although the present embodiment is configured such that the second document G2 is started to be fed as the rear edge of the first sheet S1 passes through the branch portion 19, it is possible to bring about the same effect with what described above even by an arrangement configured such that the second document G2 is started to be fed as the rear edge of the first sheet S1 passes through the junction 18.

Next, an operation of the printer 1 in a case where a second copy mode (two single surfaces to both surfaces) of forming an image of a single surface of a plurality of documents G (single surface imaging document) sequentially on both surfaces of each of a plurality of sheets S will be explained with reference to FIGS. 11A through 14C.

Figure 11A:
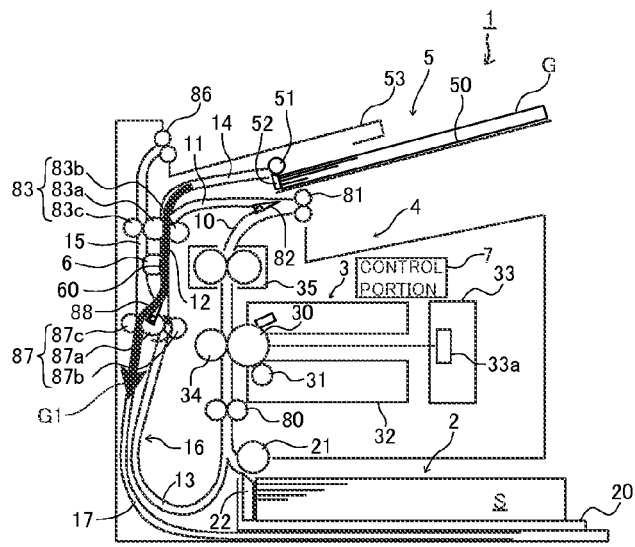
FIG. 11A is a schematic section view illustrating the operation of the printer in a second copy mode in a case where a document is conveyed to the common conveying path.
Figure 11B:
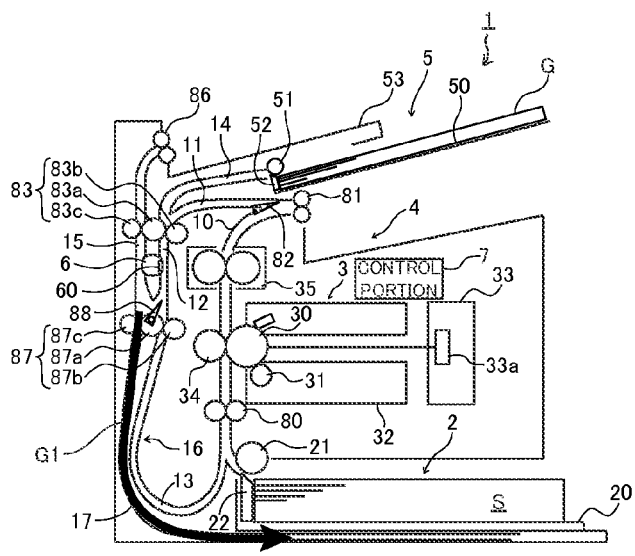
FIG. 11B is a schematic section view illustrating the operation of the printer in the second copy mode in a case where the document is conveyed to the reverse conveying path.

In response to a start of the second copy mode, a first document G1 is fed from the plurality of documents G stacked on the document tray 50 and is conveyed to the common conveying path 12 through the document feed path 14. Then, the image reading portion 6 reads an image of a first surface of the first document G1 passing through the common conveying path 12, and the second switching member 88 guides the first document G1 to the reverse conveying path 17 as shown in FIG. 11A. Then, as the document position detecting sensor 71 detects that a rear edge of the first document G1 has passed through the second switching member 88 (see FIG. 11B), the control portion 7 switches the second switching member 88 and reversely rotates the driving roller 87a to switch back the first document G1 toward the document discharge path 15.

Figure 11C:
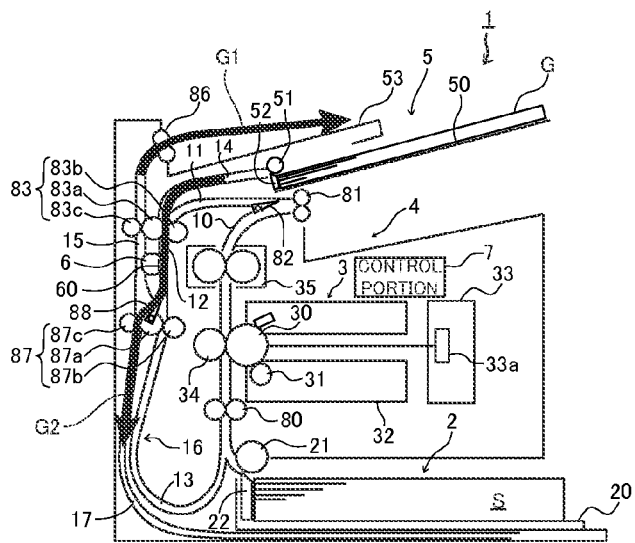
FIG. 11C is a schematic section view illustrating the operation of the printer in the second copy mode in a case where the document is discharged of the apparatus.

When the first document G1 is switched back, a second document G2 is fed from the document tray 50. As shown in FIG. 11C, the second document G2 is conveyed to the common conveying path 12 through the document feed path 14. Then, the image reading portion 6 reads an image of a first surface of the second document G2 on the common conveying path 12, and the second switching member 88 guides the second document G2 to the reverse conveying path 17. Meanwhile, the switched back first document G1 is discharged to the discharged document stacking portion 53.

When the document position detecting sensor 71 detects that an rear edge of the second document G2 has passed through the second switching member 88 (see FIG. 12A), the control portion 7 switches the second switching member 88 and reversely rotates the driving roller 87a to switch back the second document G2 toward the document discharge path 15. When the second document G2 is switched back, a first sheet S1 is started to be fed before the second document G2 is discharged to the discharged document stacking portion 53 as shown in FIG. 12B. That is, the conveyance of the second document G2 and the operation of forming the image on a first surface of the first sheet S1 are concurrently executed. After that, the second document G2 is discharged to the discharged document stacking portion 53 and the first sheet S1 on which the image of the first document G1 has been formed on the first surface thereof is switched back by the discharge roller pair 81 and is conveyed toward the common conveying path 12 as shown in FIG. 12C.

Figure 13A:
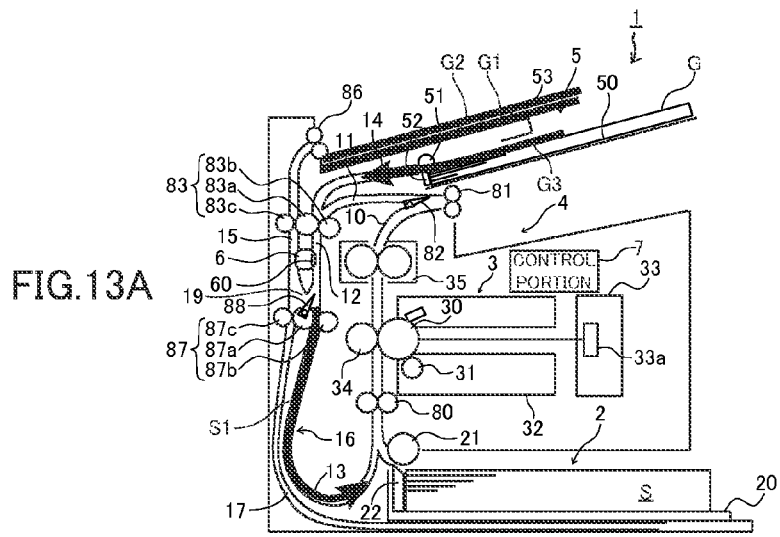
FIG. 13A is a schematic section view illustrating the operation of the printer in the second copy mode in a case where a document is conveyed to the common conveying path.
Figure 13B:
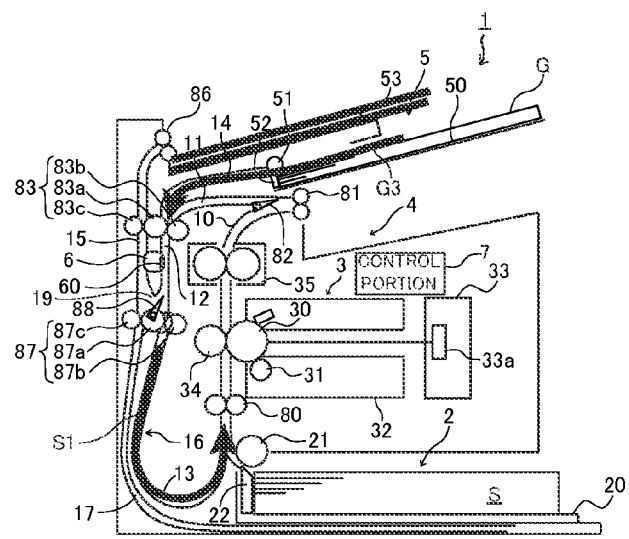
FIG. 13B is a schematic section view illustrating the operation of the printer in the second copy mode in a case where the sheet is conveyed to the sheet conveying path.
Figure 13C:
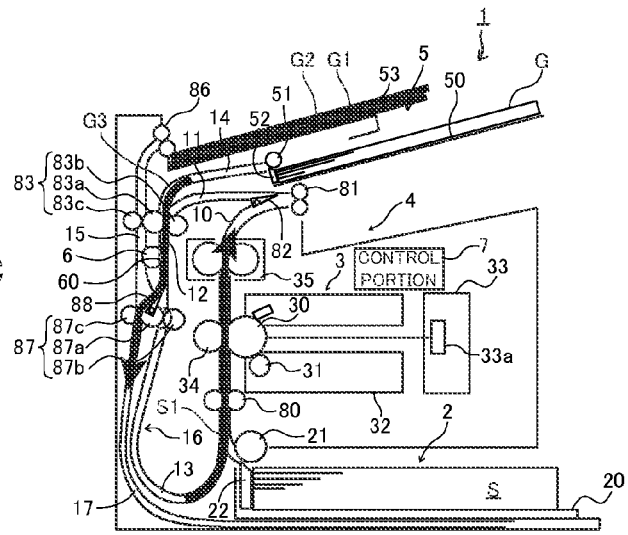
FIG. 13C is a schematic section view illustrating the operation of the printer in the second copy mode in a case where the document is conveyed to the reverse conveying path.

When the sheet position detecting sensor 72 detects that a rear edge of the first sheet S1 has passed through the branch portion 19, the document feed roller 51 starts to feed a third document G3 as shown in FIG. 13A. Thereby, the duplex conveying path 16 is put into a condition in which the third document G3 follows the first sheet S1 and at least a part of the document and at least a part of the sheet are present mixedly on the duplex conveying path 16. Then, when the rear edge of the first sheet S1 passes through the nip between the driving roller 87a and the roller 87b, the control portion 7 switches the second switching member 88 and reversely rotates the driving roller 87a as shown in FIG. 13B. Thereby, the image reading portion 6 reads an image of a first surface of the third document G3 passing through the common conveying path 12 and then the second switching member 88 guides the third document G3 to the reverse conveying path 17 as shown in FIG. 13C. At this time, the first sheet S1 is conveyed again through the sheet conveying path 10 and the image of the first surface of the second document G2 is formed on a second surface of the first sheet S1 on the sheet conveying path 10.

Figure 14A:
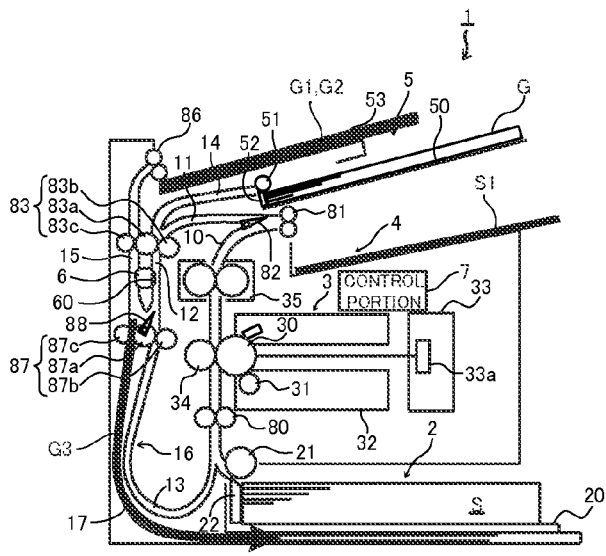
FIG. 14A is a schematic section view illustrating the operation of the printer in the second copy mode in a case where the document is conveyed to the reverse conveying path.
Figure 14B:
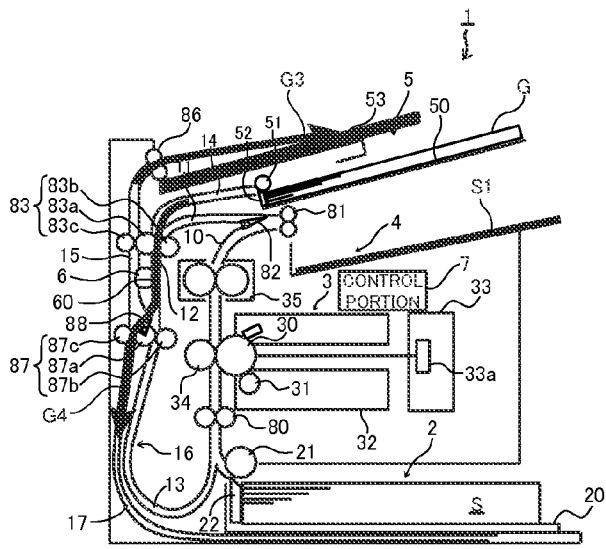
FIG. 14B is a schematic section view illustrating the operation of the printer in the second copy mode in a case where the document is conveyed to the common conveying path.

Next, when the document position detecting sensor 71 detects that a rear edge of the third document G3 has passed through the second switching member 88 (see FIG. 14A), the control portion 7 switches the second switching member 88 and reversely rotates the driving roller 87a to switch back the third document G3 toward the document discharge path 15. When the third document G3 is switched back, a fourth document G4 is fed from the document tray 50. As shown in FIG. 14B, the fourth document G4 is conveyed to the common conveying path 12 through the document feed path 14, the image reading portion 6 reads an image of a first surface of the fourth document G4 passing through the common conveying path 12 and the second switching member 88 guides the fourth document G4 to the reverse conveying path 17. Meanwhile, the third document G3 switched back is discharged to the discharged document stacking portion 53.

Figure 14C:
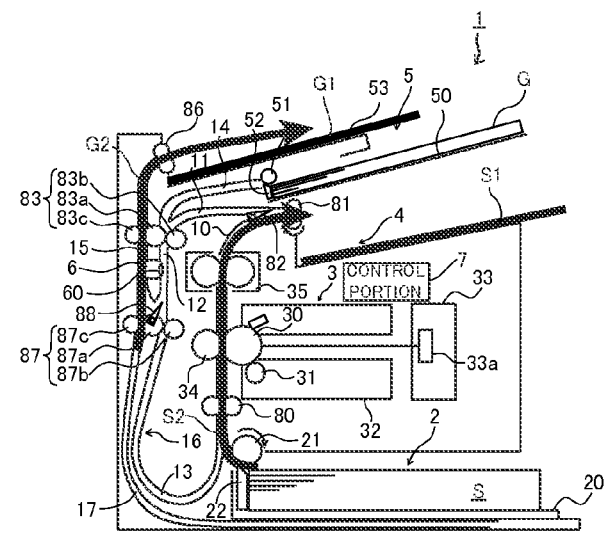
FIG. 14C is a schematic section view illustrating the operation of the printer in the second copy mode in a case where a sheet is fed.

When the document position detecting sensor 71 detects that a rear edge of the fourth document G4 has passed through the second switching member 88, the control portion 7 switches the second switching member 88 and reversely rotates the driving roller 87a to switch back the fourth document G4 toward the document discharge path 15. When the fourth document G4 is switched back as shown in FIG. 14C, a second sheet S2 is started to be fed to the sheet conveying path 10 before the fourth document G4 is discharged to the discharged document stacking portion 53. Thus, the conveyance of the fourth document G4 and the operation of forming the image on the first surface of the second sheet S2 are carried out concurrently. In a case where copying is carried out continuously after that, the abovementioned operation is repeatedly carried out and copying of a predetermined number of sheets ends, the second copy mode ends. Meanwhile, in a case where copying ends by the second sheet S2, the second copy mode ends by forming the images of the both surfaces of the second document G2 on the both surfaces of the second sheet S2.

As described above, the printer 1 is configured such that the second document G2 is started to be fed as the rear edge of the first sheet S1 passes through the branch portion 19 so that the sheet and the document are present mixedly on the duplex conveying path 16 also in the second copy mode. Therefore, it is possible to prevent the productivity of the printer 1 from dropping even in the case of executing the copy mode of forming the images read in the configuration of reading the images of the document G on the duplex conveying path 16 on the both surfaces of the sheet. This makes it possible to prevent the drop of the productivity while downsizing the printer 1.

It is noted that it is possible to bring about the same effect as described above in the same manner with the first copy mode even by a configuration in which the second document G2 is started to be fed as the rear edge of the first sheet S1 passes through the junction 18. Still further, the same effect may be brought about in a copy mode of so-called N in 1 in which images of N documents are formed on one sheet, other than the first copy mode (1 in 1) and the second copy mode (2 in 1).

Next, an operation of the printer 1 in a case where the operation of reading images of a plurality of documents G and a third copy mode of performing duplex printing of printing image information transmitted from an external computer or the like on a plurality of sheets, i.e., different jobs are overlapped, will be explained with reference to FIGS. 15 through 17.

Figure 15A:
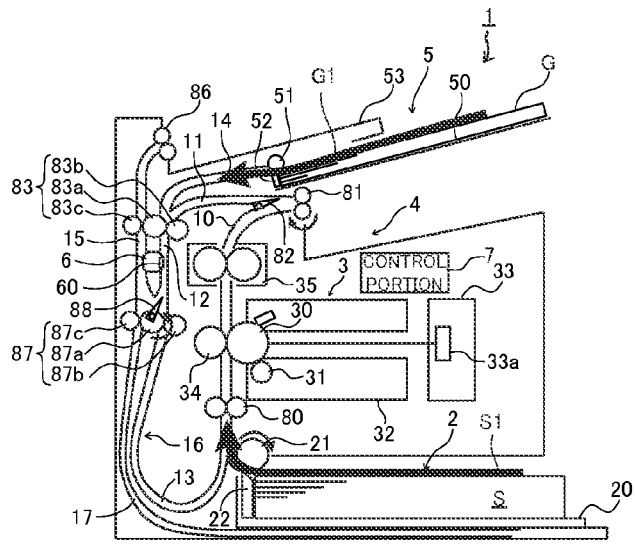
FIG. 15A is a schematic section view illustrating an operation of printer concurrently executing the third copy mode and image-reading in a case where a document is conveyed to the common conveying path.
Figure 15B:
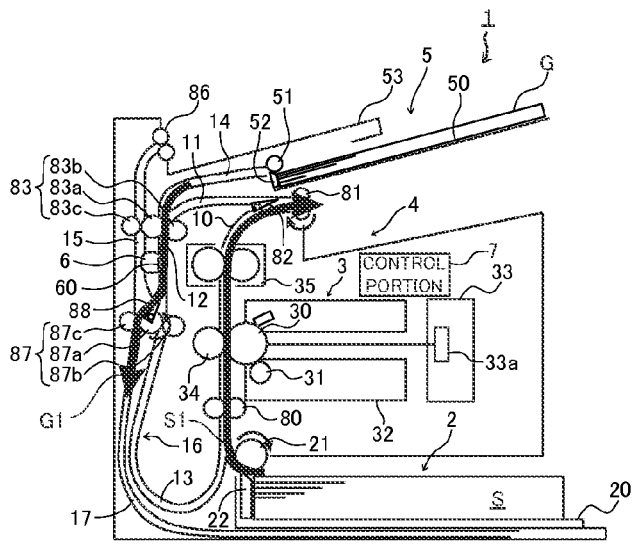
FIG. 15B is a schematic section view illustrating the operation of printer concurrently executing the third copy mode and image-reading in a case where the document is conveyed to the reverse conveying path.

In the case where the operation of reading images of the plurality of documents is overlapped with the third copy mode, the first sheet S1 and the first document G1 are started to be fed almost simultaneously as shown in FIG. 15A. The transmitted image is formed on a first surface of the first sheet S1 by passing through the sheet conveying path 10 as shown in FIG. 15B. Meanwhile, an image of a first surface of the first document G1 is read while passing through the common conveying path 12 and the first document G1 is guided to the reverse conveying path 17 by the second switching member 88. The read image information is stored in the memory M.

Figure 15C:
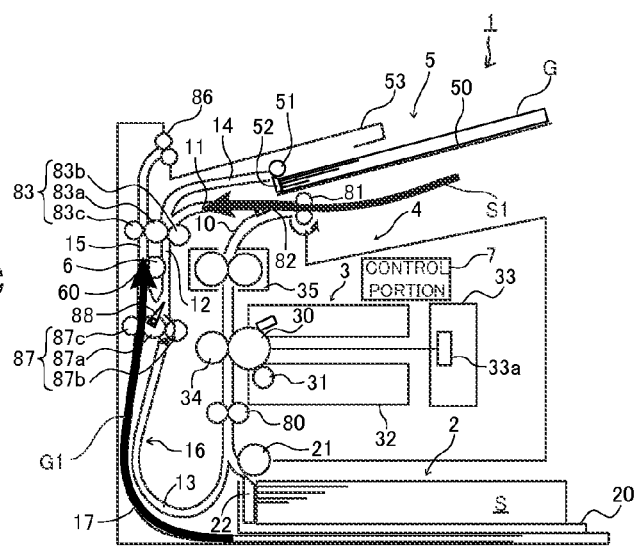
FIG. 15C is a schematic section view illustrating the operation of printer concurrently executing the third copy mode and image-reading in a case where the sheet is conveyed to the common conveying path.

The first sheet S1 on which the image has been formed on the first surface thereof is then switched back by the discharge roller pair 81 and the first switching member 82 toward the common conveying path 12 as shown in FIG. 15C. Meanwhile, the first document G1 whose image of the first surface thereof has been read is switched back by the second switching member 88, the driving roller 87a and the roller 87c from the reverse conveying path 17 toward the document discharge path 15.

Figure 16A:
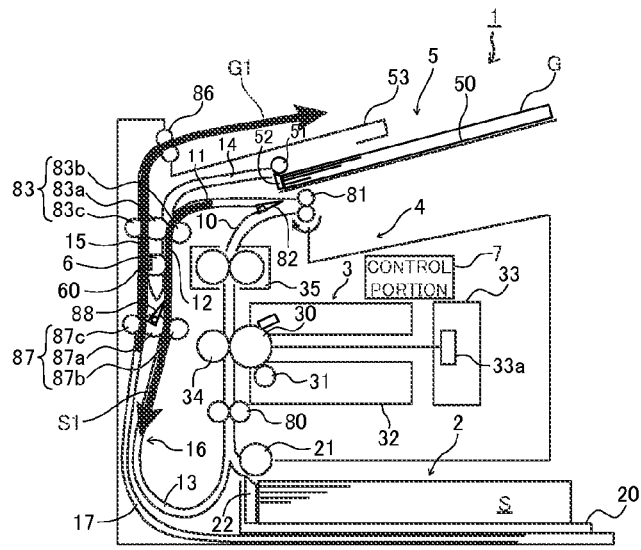
FIG. 16A is a schematic section view illustrating the operation of printer concurrently executing the third copy mode and image-reading in a case where the sheet is conveyed to the common conveying path.

After that, as shown in FIG. 16A, the first sheet S1 is conveyed to the U-turn conveying path 13 by passing through the common conveying path 12 and an image of a second surface of the first document G1 is read while being conveyed through the document discharge path 15. The read image information of the second surface of the first document G1 is stored in the memory M together with the image information of the first surface. It is noted that these operation of the conveyance of the sheet and of reading the second surface of the document are carried out concurrently. This is made possible because the duplex conveying triple roller 83 is disposed across the common conveying path 12 and the document discharge path 15 and the conveyance of the sheet and the document can be made concurrently by driving the driving roller 83a. Specifically, the duplex conveying triple roller 83 is provided so as to be able to convey the document on the document discharge path 15 by the driving roller 83a and the roller 83c and to convey the sheet on the common conveying path 12 by the driving roller 83a and the roller 83b.

Figure 16B:
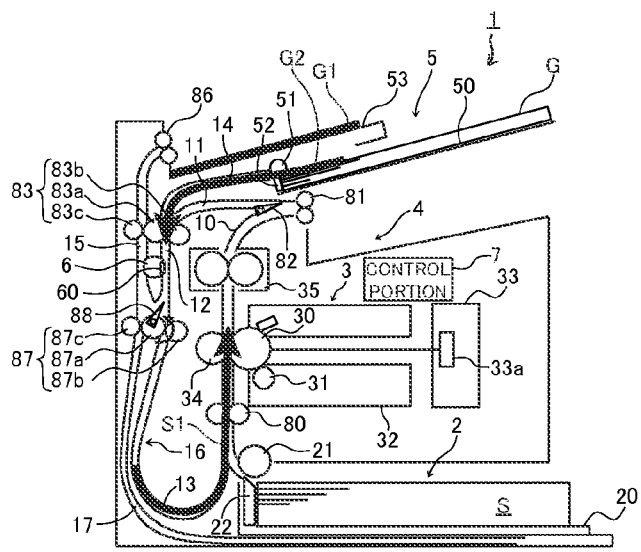
FIG. 16B is a schematic section view illustrating the operation of printer concurrently executing the third copy mode and image-reading in a case where a document is conveyed to the common conveying path.

As shown in FIG. 16B, the first document G1 whose image on the second surface has been read is discharged to the discharged document stacking portion 53. Meanwhile, the first sheet S1 is conveyed again to the sheet conveying path 10 and the transmitted image is formed on the second surface thereof on the sheet conveying path 10. When the sheet position detecting sensor 72 detects that a rear edge of the first sheet S1 has passed through the branch portion 19, the document feed roller 51 starts to feed a second document G2. Thereby, the duplex conveying path 16 is put into a condition in which the second document G2 follows the first sheet S1 and at least a part of the second document G2 and at least a part of the first sheet S1 are present mixedly on the duplex conveying path 16.

Figure 16C:
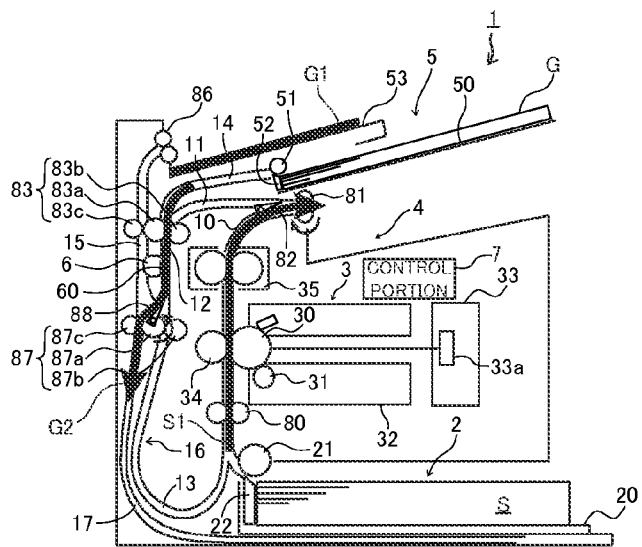
FIG. 16C is a schematic section view illustrating the operation of printer concurrently executing the third copy mode and image-reading in a case where the document is conveyed to the reverse conveying path.
Figure 17A:
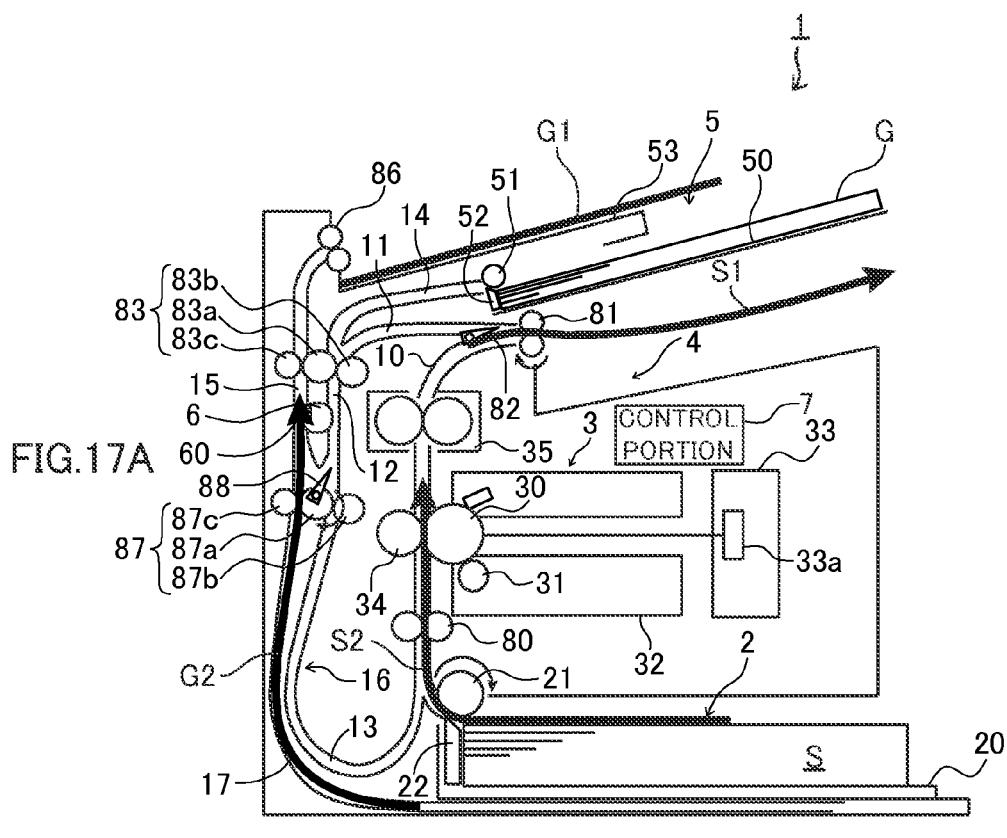
FIG. 17A is a schematic section view illustrating the operation of printer concurrently executing the third copy mode and image-reading in a case where a sheet is fed.

Then, the image reading portion 6 reads an image of a first surface of the second document G2 passing through the common conveying path 12 and then the second switching member 88 guides the second document G2 to the reverse conveying path 17 as shown in FIG. 16C. It is noted that the read image information of the first surface is stored in the memory M. After that, a second sheet S2 is fed to the sheet conveying path 10 and an image is formed on the first surface of the second sheet S2 before the first sheet S1 is discharged by the discharge roller pair 81 to the sheet stacking portion 4 as shown in FIG. 17A. At this time, the second document G2 is switched back by the second switching member 88, the driving roller 87a and the roller 87c from the reverse conveying path 17 toward the document discharge path 15 and the image of the second surface of the second document G2 is read on the document discharge path 15. It is noted that the read image information of the second surface of the second document G2 is stored together with the image information of the first surface in the memory M.

Figure 17B:
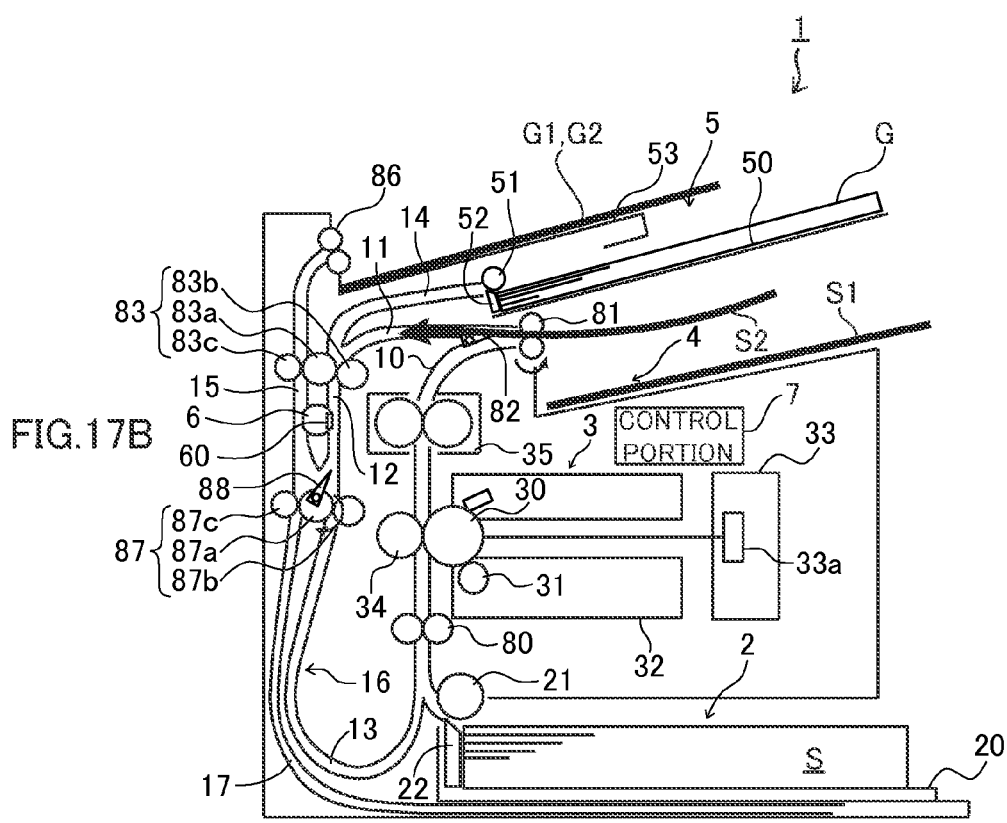
FIG. 17B is a schematic section view illustrating the operation of printer concurrently executing the third copy mode and image-reading in a case where the sheet is conveyed to the common conveying path.

As shown FIG. 17B, the second document G2 whose image of the second surface has been read is discharged to the discharged document stacking portion 53 and the second sheet S2 is switched back by the discharge roller pair 81 and the first switching member 82 toward the common conveying path 12. In a case where a document G to be read continuously exists, a third document is started to be fed as the sheet position detecting sensor 72 detects that a rear edge of the second sheet S2 has passed through the branch portion 19 (see FIG. 16B). That is, the document is started to be fed based on the position of the rear edge of the sheet such that the sheet and the document are present mixedly on the duplex conveying path 16.

As described above, the printer 1 is configured such that the document is started to be fed as the rear edge of the sheet passed through the branch portion 19 so that the sheet and the document are present mixedly on the duplex conveying path 16 in the case where the operation of reading images of the plurality of documents overlaps with the third copy mode. Therefore, it is possible to prevent the productivity of the printer 1 from dropping even in the case of executing the copy mode of forming images read in the configuration of reading the images of the document G on the duplex conveying path 16 on the both surfaces of the sheet. This makes it possible to prevent the drop of the productivity while downsizing the printer 1.

In a case where a user who performs the operation of reading images of a plurality of documents and a user who performs the third copy mode are different, one user must wait if the image reading operation and the copying are separately. However, the jobs can be executed in real time without forcing one user to wait by performing the image reading operation and copying concurrently as described above.

It is noted that the same effect with what described above may be also brought about by adopting the configuration of starting to feed the second document G2 as the rear edge of the first sheet S1 passes through the junction 18 in the same manner with the first copy mode described above. Still further, in a case of performing the document reading operation interruptedly in a state in which continuous duplex printing has been already started, or of performing duplex printing interruptedly in a state in which a continuous document reading operation has been already started, it is unable to start the feed operation concurrently. In such a case, the duplex printing and the document reading operation may be performed by repeating the operations described with reference to FIGS. 16B through 17B after adjusting timing of the feed operation at first.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-092117, filed on Apr. 25, 2013 which is hereby incorporated by reference herein in its entirety.

What is claimed is:

1. An image forming apparatus comprising:
a sheet feed portion configured to feed a sheet;
an image forming portion configured to form an image on the sheet;
a first conveying path configured to guide the sheet fed by the sheet feed portion to the image forming portion;
a second conveying path configured to guide the sheet on which the image has been formed on one surface thereof by the image forming portion to the first conveying path again;
a document feed portion configured to feed a document to the second conveying path;
an image reading portion configured to read an image of the document fed by the document feed portion; and
a control portion configured to control a conveyance operation of the sheet and the document,
wherein the control portion is configured to control the conveyance operation of the sheet and the document such that at least part of the document and at least part of the sheet are existing on the second conveying path at the same time in a case where an operation of forming images respectively on both surfaces for a plurality of sheets and an operation of reading images for a plurality of documents are executed in series.

2. The image forming apparatus according to claim 1, wherein the control portion controls the sheet feed portion and the document feed portion such that the sheet and the document are conveyed alternately through the second conveying path in the case where the operation of forming images respectively on both surfaces of the plurality of the sheets overlaps with the operation of reading the images of the documents.

3. The image forming apparatus according to claim 2, further comprising:
a document discharge portion configured to discharge the document from which at least of an image of a first surface thereof has been read by the image reading portion; and
a document reverse conveying portion configured to reverse and convey the document from which the image of the first surface thereof has been read by the image reading portion on the second conveying path to the document discharge portion;
wherein the image reading portion reads an image of a second surface of the document conveyed by the document reverse conveying portion toward the document discharge portion.

4. The image forming apparatus according to claim 3, further comprising:
a document feed path configured to guide the document fed by the document feed portion to the second conveying path;
a reverse conveying path branched from the second conveying path and guiding the document from which the image thereof has been read downward to reverse the document;
a document discharge path connected to the reverse conveying path and guiding the document to the document discharge portion;
wherein the document reverse conveying portion is composed of a document reverse conveying roller pair configured to guide the document from which the image of the first surface thereof has been read on the second conveying path to the reverse conveying path and then conveys the document to the document discharge path in a state in which the document is reversed; and
wherein the image reading portion reads the image of the second surface of the document when the document moves through the document discharge path.

5. The image forming apparatus according to claim 4, wherein the control portion controls the document feed portion to feed the document to the second conveying path as a rear edge of a preceding sheet passes through a branch part of the second conveying path and the reverse conveying path.

6. The image forming apparatus according to claim 5, wherein the control portion controls the sheet feed portion to feed a succeeding sheet to the first conveying path before the document is discharged by the document discharge portion.

7. The image forming apparatus according to claim 6, wherein in a case where the image reading portion reads the images of the both surfaces of the plurality of documents and the read images are to be formed respectively on the both surfaces of the plurality of sheets, the control portion controls the document feed portion to feed a second document to the second conveying path after a first document has been conveyed to the reverse conveying path and as the rear edge of the sheet on which the image of the document has been formed on the first surface thereof passes through the branch part of the second conveying path and the reverse conveying path.

8. The image forming apparatus according to claim 6, wherein in a case where the image reading portion reads images of single surfaces of the plurality of documents and the read images are to be formed respectively on the both surfaces of the plurality of sheets, the control portion controls the document feed portion to feed a third document to the second conveying path after the second document has been conveyed to the reverse conveying path and as a rear edge of a sheet on which the image of the document has been formed on a first surface thereof passes through the branch part of the second conveying path and the reverse conveying path.

9. The image forming apparatus according to claim 6, wherein in a case where the image reading portion reads images of both surfaces of the plurality of documents and the read images are to be formed respectively on the both surfaces of the plurality of sheets, the control portion controls the document feed portion to feed a second document to the second conveying path after a first document has been conveyed to the reverse conveying path and as a rear edge of a sheet on which the image of the first document has been formed on the first surface thereof passes through the branch part of the document feed path and the second conveying path.

10. The image forming apparatus according to claim 6, wherein in a case where the image reading portion reads images of single surfaces of the plurality of documents and the read images are to be formed respectively on the both surfaces of the plurality of sheets, the control portion controls the document feed portion to feed a third document to the second conveying path after the second document has been conveyed to the reverse conveying path and as a rear edge of a sheet on which the image of the first document has been formed on the first surface thereof passes through the junction of the document feed path and the second conveying path.

11. The image forming apparatus according to claim 1, wherein the control portion performs the operation of forming images respectively on the both surfaces of the plurality of sheets and the operation of reading the images of the plurality of the documents in accordance to different jobs.

12. The image forming apparatus according to claim 11, wherein the control portion controls the document feed portion such that a plural of documents pass through the second conveying path after the preceding sheet has passed through the second conveying path and before the succeeding sheet passes through the common conveying path.

13. An image forming apparatus comprising:
a sheet feed portion configured to feed a sheet;
an image forming portion configured to form an image on the sheet;
a first conveying path configured to guide the sheet fed by the sheet feed portion to the image forming portion;
a second conveying path configured to guide the sheet on which the image has been formed on one surface thereof by the image forming portion again to the first conveying path;
a document feed portion configured to feed a document to the second conveying path;
an image reading portion configured to read an image of the document fed by the document feed portion; and
a control portion configured to control a conveyance operation of the sheet and the document,
wherein the control portion configured to execute a mode in which a (x)th sheet passes through the second conveying path after a (n)th document, where (x) and (n) are arbitrary natural numbers, has passed through the second conveying path and before a (n+1)th document passes through the second conveying path in a case where an operation of forming images respectively on both surfaces for a plurality of sheets and an operation of reading images for a plurality of documents are executed in series.

14. The image forming apparatus according to claim 13, wherein the control portion controls the sheet feed portion and the document feed portion such that the sheet and the document are conveyed alternately through the second conveying path in the case where the operation of forming images respectively on the both surfaces of the plurality of sheets overlaps with the operation of reading the images of the plurality of the documents.

15. The image forming apparatus according to claim 13, further comprising:
a document reverse conveying portion reversing and conveying the document from which the image of the first surface thereof has been read by the image reading portion on the second conveying path to the document discharge portion;
wherein the image reading portion reads an image of a second surface of the document conveyed by the document reverse conveying portion toward the document discharge portion.

16. The image forming apparatus according to claim 15, further comprising:
a document feed path guiding the document fed by the document feed portion to the second conveying path;
a reverse conveying path branched from the second conveying path and guiding the document from which the image thereof has been read downward to reverse the document; and
a document discharge path connected to the reverse conveying path and guiding the document to the document discharge portion,
wherein the document reverse conveying portion is composed of a document reverse conveying roller pair configured to guide the document from which the image of the first surface thereof has been read on the second conveying path to the reverse conveying path and then to convey the document to the document discharge path in a state in which the document is reversed, and
wherein the image reading portion reads an image of a second surface of the document as the document moves through the document discharge path.

17. The image forming apparatus according to claim 16, wherein the control portion controls the document feed portion to feed the (n+1)th document to the second conveying path as a rear edge of the (x)th sheet passes through a branch part of the second conveying path and the reverse conveying path.

18. The image forming apparatus according to claim 15, wherein the control portion controls the sheet feed portion to feed a (x+1)th sheet to the first conveying path before the (n+1)th document is discharged by the document discharge portion.

19. An image forming apparatus comprising:
an image forming unit configured to form an image on a sheet;
a first stacking portion on which the sheet is stacked;
a first feeding unit configured to feed the sheet stacked on the first stacking portion to the image forming unit;
a first discharge unit configured to discharge the sheet on which the image is formed by the image forming unit;
an image reading unit configured to read an image of the document;
a second stacking portion on which the document is stacked;
a second feeding unit configured to feed the document stacked on the second stacking portion to the image reading unit;
a second discharge unit configured to discharge the document from which the image is read by the image reading unit; and
a control portion configured to control a conveyance operation of the sheet and the document,
wherein a conveying path through which the sheet is passed in a case of forming images on both surfaces of the sheet and a conveying path through which the document which is fed by the second feeding unit and discharged from the second discharge unit is passed are partly common on a common conveying path, and
wherein the control portion configured to execute a mode in which a (x)th sheet passes through the common conveying path after a (n)th document, where (x) and (n) are arbitrary natural numbers, has passed through the common conveying path and before a (n+1)th document passes through the common conveying path in a case where an operation of forming the images respectively on the both surfaces for a plurality of sheets and an operation of reading images for a plurality of documents are executed in series.

20. The image forming apparatus according to claim 19, further comprising:
a first conveying path configured to guide the sheet from the first stacking portion to the image forming unit; and
a second conveyance path configured to guide the sheet on which the image has been formed on one surface thereof by the image forming unit to the image forming unit,
wherein the common conveying path is formed of a part of the second conveying path.

21. The image forming apparatus according to claim 20, wherein the second conveying path configured to be merged with the first conveying path.

22. The image forming apparatus according to claim 19, wherein the (n+1)th document passes through the common conveying path after the (x)th sheet has passed through the common conveying path.

23. The image forming apparatus according to claim 19, wherein the control portion executes the mode in a case of forming images on the both surface of the sheet based on read images of the document.

24. The image forming apparatus according to claim 19, wherein the control portion executes the mode in a case of executing a first job of reading the image of the document and a second job of forming the image on the sheet based on image information transmitted from a computer.

25. The image forming apparatus according to claim 19, wherein the control portion controls the conveyance of the sheet and the document by controlling the first and second feeding units.

26. An image forming apparatus comprising:
- an image forming unit configured to form an image on a sheet;
- a first stacking portion on which the sheet is stacked;
- a first feeding unit configured to feed the sheet stacked on the first stacking portion to the image forming unit;
- a first discharge unit configured to discharge the sheet on which the image is formed by the image forming unit;
- an image reading unit configured to read an image of the document;
- a second stacking portion on which the document is stacked;
- a second feeding unit configured to feed the document stacked on the second stacking portion to the image reading unit;
- a second discharge unit configured to discharge the document from which the image is read by the image reading unit; and
- a control portion configured to control a conveyance operation of the sheet and the document, wherein a conveying path through which the sheet is passed in a case of forming images on both surfaces of the sheet and a conveying path through which the document which is fed by the second feeding unit and discharged from the second discharge unit is passed are partly common on a common conveying path, and wherein the control portion configured to execute a mode in which a (x)th document passes through the common conveying path after a (n)th sheet, where (x) and (n) are arbitrary natural numbers, has passed through the common conveying path and before a (n+1)th sheet passes through the common conveying path in a case where an operation of forming the images respectively on the both surfaces for a plurality of sheets and an operation of reading images for a plurality of documents are executed in series.

* * * * *